(12) United States Patent
Barber et al.

(10) Patent No.: US 8,738,673 B2
(45) Date of Patent: May 27, 2014

(54) INDEX PARTITION MAINTENANCE OVER MONOTONICALLY ADDRESSED DOCUMENT SEQUENCES

(75) Inventors: Ronald Jason Barber, San Jose, CA (US); Harish Deshmukh, Mountain View, CA (US); Ning Li, Cary, NC (US); Bruce Gilbert Lindsay, San Jose, CA (US); Sridhar Rajagopalan, Liverpool (GB); Roger C. Raphael, San Jose, CA (US); Eugene J. Shekita, San Jose, CA (US); Paul Sherwood Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/875,615

(22) Filed: Sep. 3, 2010

(65) Prior Publication Data

US 2012/0059823 A1 Mar. 8, 2012

(51) Int. Cl.
*G06F 17/30* (2006.01)
(52) U.S. Cl.
CPC ............................ *G06F 17/30233* (2013.01)
USPC ...................................................... 707/831
(58) Field of Classification Search
CPC .............................................. G06F 17/30233
USPC ............ 707/73, 696, 711, 739–746, E17.057, 707/E17.123
See application file for complete search history.

(56) References Cited

U.S. PATENT DOCUMENTS

| | | | |
|---|---|---|---|
| 5,745,899 A | 4/1998 | Burrows | |
| 5,778,354 A | 7/1998 | Leslie et al. | |
| 7,293,016 B1 | 11/2007 | Shakib et al. | |
| 2005/0165750 A1 | 7/2005 | Shakib et al. | |
| 2006/0123062 A1 | 6/2006 | Bobbitt et al. | |
| 2008/0065596 A1 | 3/2008 | Shadmon et al. | |
| 2009/0019038 A1 | 1/2009 | Millett | |
| 2009/0063396 A1 | 3/2009 | Gangarapu et al. | |
| 2009/0177757 A1 | 7/2009 | Pottenger | |
| 2009/0327312 A1* | 12/2009 | Kakivaya et al. | 707/10 |
| 2010/0030773 A1 | 2/2010 | Patterson | |
| 2011/0029524 A1* | 2/2011 | Baptist et al. | 707/737 |

OTHER PUBLICATIONS

U.S. Appl. No. 12/616,679, filed Nov. 11, 2009, entitled "Synchronizing an Auxiliary Data System with a Primary Data System", invented by R.J. Barber, H. Deshmukh, N. Li, B.G. Lindsay, S. Rajagopalan, R.C. Raphael, and E.J. Shekita, Total 54 pp.

* cited by examiner

*Primary Examiner* — Thu-Nguyet Le
(74) *Attorney, Agent, or Firm* — Konrad Raynes Davda & Victor LLP; Janaki K. Davda

(57) ABSTRACT

Provided are techniques for partitioning a physical index into one or more physical partitions; assigning each of the one or more physical partitions to a node in a cluster of nodes; for each received document, assigning an assigned-doc-ID comprising an integer document identifier; and, in response to assigning the assigned-doc-ID to a document, determining a cut-off of assignment of new documents to a current virtual-index-epoch comprising a first set of physical partitions and placing the new documents into a new virtual-index-epoch comprising a second set of physical partitions by inserting each new document to a specific one of the physical partitions in the second set using one or more functions that direct the placement based on one of the assigned-doc-id, a field value derived from a set of fields obtained from the document, and a combination of the assigned-doc-id and the field value.

24 Claims, 26 Drawing Sheets

FIG. 6

Throughput (Type II) Trigger ↑

Capacity (Type I) Trigger →

Table 600:

| Virtual-Index-Epoch Number | Cutoff-assigned-doc-ID | Range Partition | General Partition Function | Number of Physical Partition Instances | Logical to physical partition Map | | | | |
|---|---|---|---|---|---|---|---|---|---|
| 0 | assigned-doc-ID - 0 | 0 - assigned-doc-ID - 0 | F0 | N0 = 1 | I(0,0) | | | | |
| 1 | assigned-doc-ID - 1 | assigned-doc-ID - 0 + 1 - assigned-doc-ID - 2 | F1 | N1 = 2 | I(1,0) | I(1,1) | | | |
| 2 | assigned-doc-ID - 2 | assigned-doc-ID - 1 + 1 - assigned-doc-ID - 3 | F2 | N2 = 3 | I(2,0) | I(2,1) | I(2,2) | | |
| 3 | assigned-doc-ID - 3 | assigned-doc-ID - 2 + 1 - assigned-doc-ID - 3 | F3 | N3 = 4 | I(3,0) | I(3,1) | I(3,2) | I(3,3) | |
| *4 | assigned-doc-ID - 4 | assigned-doc-ID - 3 + 1 - infinity | F4 | N4 = 5 | I(4,0) | I(4,1) | I(4,2) | I(4,3) | I(4,4) |

| Virtual-Index-Epoch Number | Range min | Range max | Range mod |
|---|---|---|---|
| 1 | 0 | 100 | 3 |
| 2 | 100 | 571 | 2 |
| 3 | 571 | 699 | 4 |
| 4 | 699 | 3019 | 6 |
| 5 | 3019 | 5748 | 3 |
| 6 | 5748 | infinity | 7 |

| Virtual-Index-Epoch Number | Logical Index Number | Physical Partition Number |
|---|---|---|
| 1 | 0 | 2 |
| 1 | 1 | 4 |
| 1 | 2 | 1 |
| 2 | 3 | 3 |
| 2 | 4 | 2 |
| 3 | 5 | 1 |
| 3 | 6 | 5 |
| 3 | 7 | 8 |
| 3 | 8 | 4 |
| 4 | 9 | 7 |
| 4 | 10 | 6 |
| 4 | 11 | 3 |
| 4 | 12 | 1 |
| 4 | 13 | 8 |
| 4 | 14 | 9 |

FIG. 8

INDEX PARTITION MAINTENANCE OVER MONOTONICALLY ADDRESSED DOCUMENT SEQUENCES

BACKGROUND

1. Field

Embodiments of the invention relate to index partition maintenance over monotonically addressed document sequences.

2. Description of the Related Art

In the current state of the art, text indexing systems are implemented as inverted lists using standard underlying file system storage. Such text indexing systems typically provide adequate performance for the odd million documents or so depending on factors such as document size (i.e., average number of tokens per document), the distribution of words that typically occur within the document corpus, and a host of other factors. A token may be described as a term (e.g., word, number, sequence of logograms, or other contiguous string of symbols) appearing in a document. When, however, one makes an attempt to scale up such text indexing systems to contain a corpus in the order of billions of documents, then, a series of capacity and performance problems occur.

First, the text indexing system runs into typical file system limits and capacity problems, where it is virtually impossible to sustain a single text index larger than the underlying file system. Typical low cost file systems are directly implemented over Just a Bunch of Disks (JBOD) or one or more spindles (disks). Transparent storage scalable file systems exist, however, they demand higher costs, more indirect management, and, typically, limited scalability with respect to the number of participating machines. Also, such a choice may not be feasible in some installations due to the added software virtualization layers causing further I/O performance problems because the text indexing implementations in the field involve a high number of file system metadata changes that such file systems have problems with in general.

Second, the I/O profiles associated with the current offering of text indexing systems is such that the I/O profile directly affects create (i.e., insert or ingest) velocity of the overlying applications using the index at the time when the inverted list implementation within the text index undergoes a hardening operation called an index merge operation. Creation of a document at the text index layers may be described as processing of the document such that the document is inserted or created and indexed within the full text indexing system. Current text indexing systems undergo a serious sequential read and sequential write of almost the entire index, causing serious dips and stalls in the performance of the creation pipeline of the overlying application using the text index. There is another stall in the current product offerings of text indexing systems called the optimize problem, which essentially also stalls the application till the entire inverted list is recreated using the old instance of the inverted lists. This is typically a long duration event that stalls the creation pipeline of the overlying application.

Thirdly, another class of problems includes the term distribution problem. This problem involves the distribution of words within the document corpus being stored within the text index, which is sometimes referred to the term dictionary of the document corpus. It is altogether possible that simply attempting to activate and open the text index with the current product offerings could potentially consume all the memory resources of the hosting system simply to load in memory the first level term index/dictionary. In some cases, it could be virtually impossible to load for indexes that have very large term distributions demanding that the index be split and managed as a single index with a single virtual index view.

Fourth, on the side of search, performance due to very large term dictionaries can degrade.

For example, with reference to a conventional index there are inherent limits to which persistent file structures can actually be hosted in the text indexing systems at runtime. Certain structures, such as the first level term index file, at some point cannot be managed properly in memory due to finite memory that is available to the JAVA™ Virtual Machine (JVM) heap. JAVA is a trademark of Sun Microsystems in the United States and/or other countries. Also, a conventional index may be hosted in a directory and inherently must lie within the storage limits of an underlying physical file system. This implies that the file system storage limits would decide the maximum size of the index. A single conventional index has to lie within certain optimal limits in the posting lists to have reasonable search performance, assuming that the term distribution would reach a certain steady state at some point in the life cycle of the file system. A single conventional index would have a peak creation rate associated with the underlying performance of the file system and storage and available Central Processing Unit (CPU).

Thus, as described, there are a number problems associated with single very large full text indexes. Operationally, such indexes could exceed the file system capacity limits, which causes problems. The performance and throughput limits can also be seriously affected with such single very large indexes as in the case insertion of new documents into it as well as when performing a search or query. For example, dips and stalls in response times are known to occur when there are merge operations or index optimization performed internally to compact and maintain itself.

In conclusion, there is a need for transparently and optimally partitioning and managing text indexes with a single virtual view to an application that utilizes the text indexes.

BRIEF SUMMARY

Provided are a method, computer program product, and system for partitioning a physical index into one or more physical partitions; assigning each of the one or more physical partitions to a node in a cluster of nodes; for each received document, assigning an assigned-doc-ID comprising an integer document identifier; and, in response to assigning the assigned-doc-ID to a document, determining a cut-off of assignment of new documents to a current virtual-index-epoch comprising a first set of physical partitions and placing the new documents into a new virtual-index-epoch comprising a second set of physical partitions by inserting each new document to a specific one of the physical partitions in the second set using one or more functions that direct the placement based on one of the assigned-doc-id, a field value derived from a set of fields obtained from the document, and a combination of the assigned-doc-id and the field value.

BRIEF DESCRIPTION OF THE SEVERAL VIEWS OF THE DRAWINGS

Referring now to the drawings in which like reference numbers represent corresponding parts throughout:

FIG. 4 is formed by FIGS. 4A, 4B, 4C, and 4D.

FIG. 5 is formed by FIGS. 5A, 5B, and 5C.

FIG. 6 illustrates a view of a structure showing four virtual-index-epoch transitions resulting in five virtual-index-epochs in accordance with certain embodiments.

FIG. 7 illustrates an example of a persisted virtual-index-epoch map in accordance with certain embodiments.

FIG. 8 illustrates a group structure and use of an example group function in accordance with certain embodiments.

FIG. 9 is formed by FIGS. 9A, 9B, and 9C.

FIG. 11 is formed by FIGS. 11A, 11B, and 11C.

FIG. 13 is formed by FIGS. 13A and 13B.

DETAILED DESCRIPTION

Figure 1:
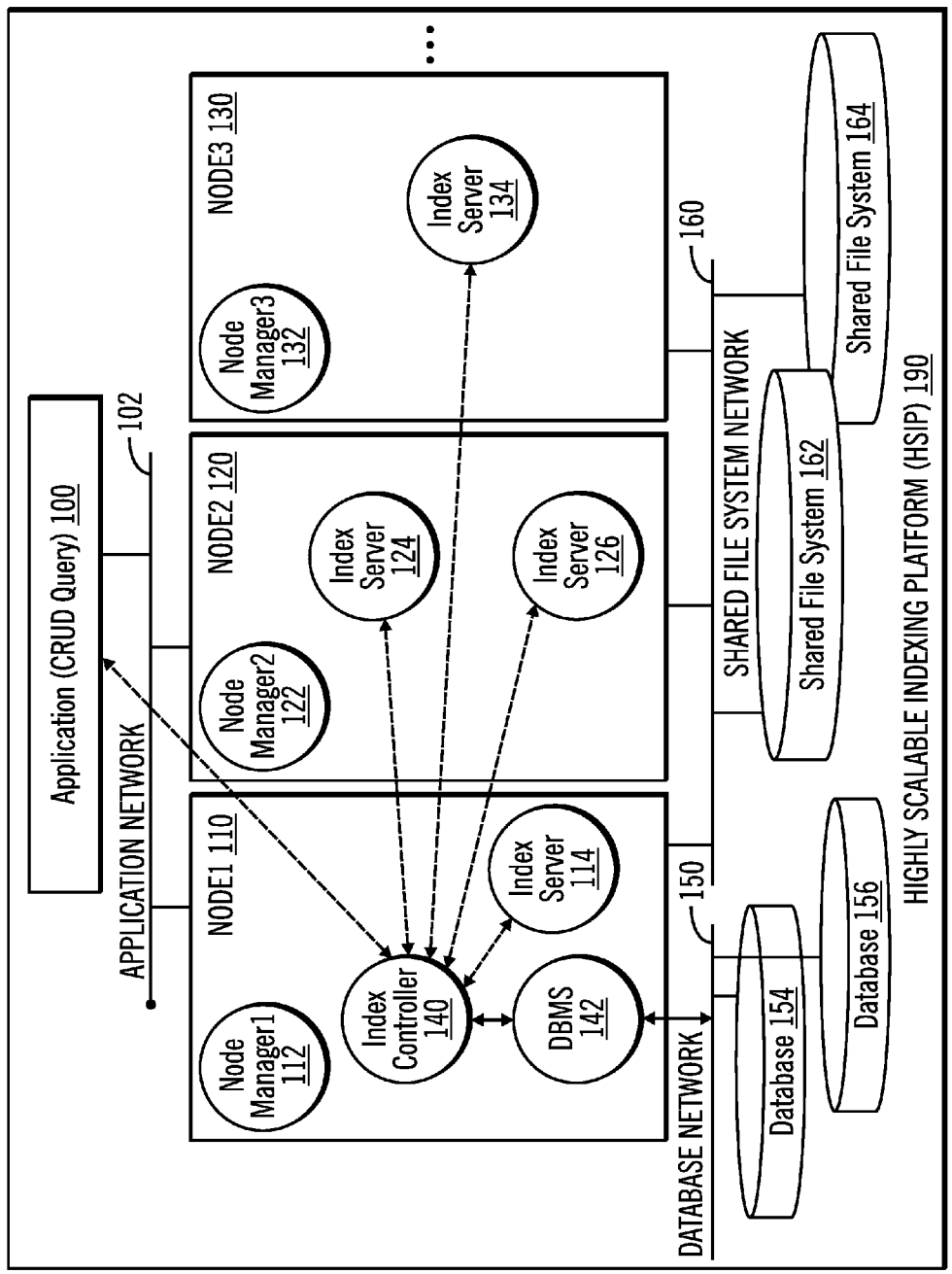
FIG. 1 illustrates a computing architecture in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

Thus, irrespective of the problems with the current state of the art, embodiments achieve steady state peak creation and search velocity using a virtual index that imbibes a series of autonomically managed underlying physical (i.e., real) indexes.

Embodiments dynamically partition text indexes transparently, while providing a single virtualized view of the index to an overlying application that could use the index with a single interface for create, modify, delete and search operations.

Embodiments provide a two-dimensional dynamic partitioning scheme (in the form of a virtual-index-epoch map) that affords a mechanism to provide a single system view or a virtualized view of multiple underlying physical partitions (e.g., physical indexes). The term "single system view" is analogous to the term "single system image" used in operating systems. The term refers to an underlying system providing a way for some outside consumer application to think that it is dealing with one entity, even though that underlying system is actually manipulating many entities. The term "virtulized view" is also used.

Embodiments provide an internal monotonic sequenced integer called an assigned-doc-ID (i.e., assigned-document-identifier) to be assigned and associated with each document that is created. This permits an integer range cutoff partition scheme based on the assigned-doc-ID which is used for the first dimension. In addition a user defined or load defined open partitioning scheme is introduced in the second dimension within each cutoff range. In certain embodiments, a row in this two-dimensional dynamic partitioned scheme represents a virtual-index-epoch that may be triggered autonomically or manually. In embodiments, a virtual-index-epoch may be described as a state partitioning state snapshot in the first dimension.

Embodiments provide a Highly Scalable Indexing Platform (HSIP). The HSIP usually starts with a hand tooled single established virtual-index-epoch numbered zero. Subsequently, as triggers in the first dimension occur, embodiments create a new virtual-index-epoch that becomes the new current virtual-index-epoch and cut's off the previous virtual-index-epoch, thereby assigning a monotonic range to the previous virtual-index-epoch. In certain embodiments, the triggers in the first dimension are typically fired on capacity feedback mechanisms of the HSIP. In certain embodiments, the triggers in the second dimension are typically fired based on throughput and response time feedback. In certain embodiments, the virtualized view provides the transparency to the hosting application in these dimensions of the underlying scaling out or up the physical partitions.

FIG. 1 illustrates a computing architecture in accordance with certain embodiments. The components 102-164 of FIG. 1 may be described as a Highly Scalable Indexing Platform (HSIP) 190 in accordance with certain embodiments. FIG. 1 introduces the notion of a "node" defined as a hardware computer system consisting of CPU, memory, disk and at least one network adapter (e.g., such as the computer system of FIG. 16). The nodes described are not necessarily symmetric in respect. An application 100 is coupled to node1 110, node2 120, and node3 130 via an application network 102. Each node 110, 120, and 130 includes a node manager. The node manager is a software component that is responsible to monitor and manage the other software components (like the index servers) of the HSIP 190 that are materialized on the specific node. In the illustration of FIG. 1, node1 110 includes node manager1 (NM1) 112, node2 120 includes node manager2 (NM2) 122, and node3 130 includes node manager3 (NM3) 132. An index controller (IC) 140 resides in one of the nodes 110, 120, and 130. In the illustration of FIG. 1, the index controller 140 resides in node1 110. Each node 110, 120, and 130 includes one or more index servers (ISs). In the illustration of FIG. 1, node1 110 includes index server (IS) 114, node2 120 includes index servers (ISs) 124, 126, and node3 130 includes index server (IS) 134.

The index controller 140 is coupled to a DataBase Management System (DBMS) 142. The DBMS 142 is coupled, via a database network 150, to one or more databases. In the illustration of FIG. 1, the DMBS 142 is coupled to databases 154, 156. In certain embodiments, there is one instance of the DBMS 142, and the DBMS 142 may run on any one of the nodes 110, 120, 130 depending on the DBMS configurations and storage setup.

The nodes 110, 120, and 130 are coupled to one or more shared file systems via a shared file system network 160. In some embodiments this could be a standard shared file system like NFS, CFS or GPFS where in the file system network 160 is none other than an IP based network. In the illustration of FIG. 1, the nodes 110, 120, and 130 are coupled to shared file systems 162, 164.

The application 100 issues Create, Read, Update, and Delete (CRUD) operations or query operations via an application network to the index controller 140. The index controller 140 forwards the CRUD operations and/or queries to the appropriate index server 114, 124, 126, 134 to process. The index server[s] 114, 124, 126, 134 accesses the appropriate shared file system 162, 164 to process the associated CRUD and/or partial query operations.

The use of ellipses in FIG. 1 indicates that there can be any number of nodes (although three nodes 110, 120, and 130 are illustrated). Each of the nodes 110, 120, and 130 hosts one or more indexes that are stored in the shared file systems 162, 164. The nodes 110, 120, and 130 may be of different capabilities, sizes, and some nodes 110, 120, 130 may host multiple index servers (e.g., node2 120 hosts two index servers 124, 126). Also, a subset of active nodes may form a group within the cluster of nodes at any point in time.

In certain embodiments, the index controller 140 is designed to failover to a passive instance of another index controller on some alternate node within the active group of nodes, and, together, the index controllers can be deemed to be operating in an active/passive mode. There may be zero or more passive instances of the index controller.

Figure 2:
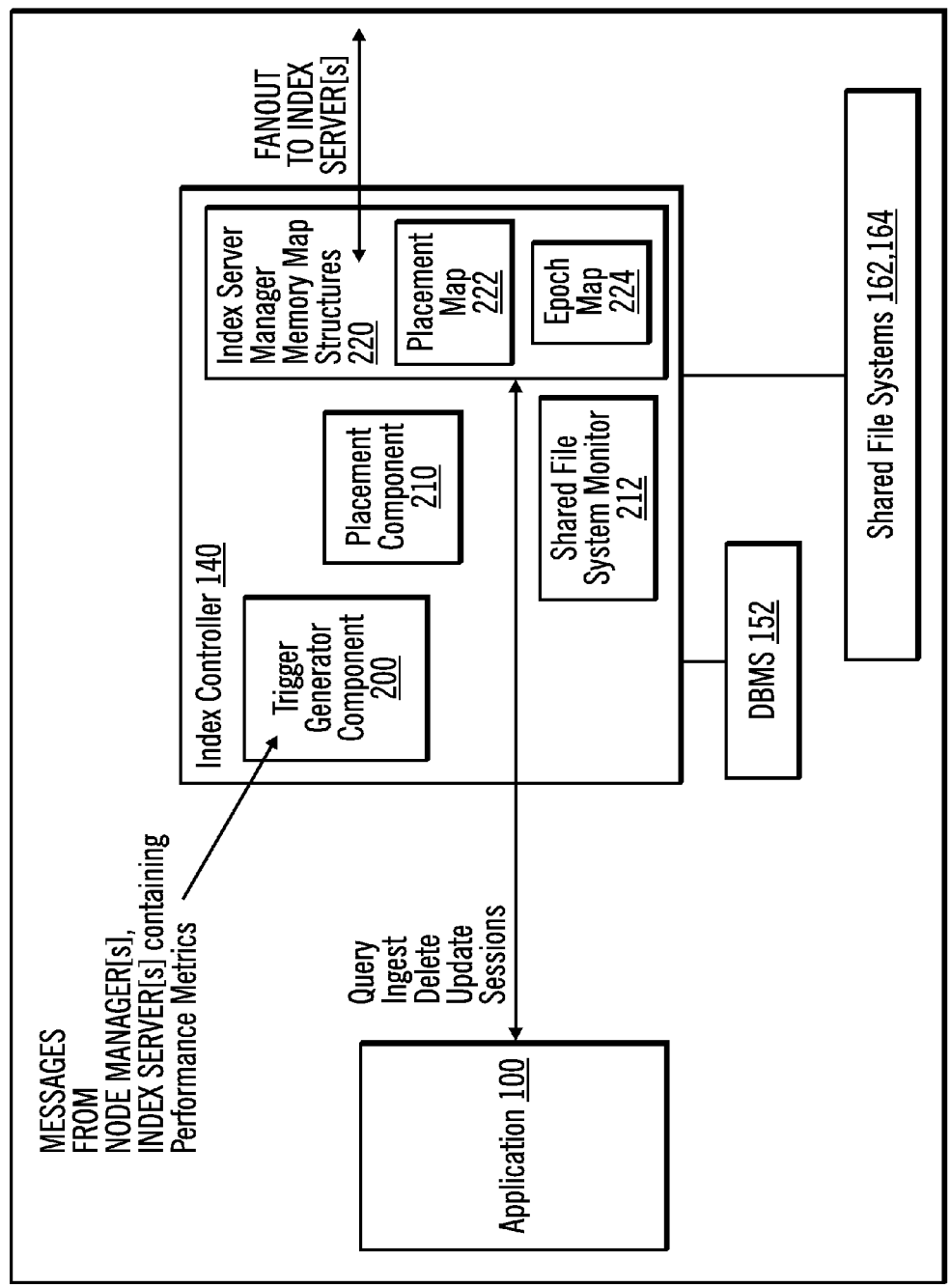
FIG. 2 illustrates further details of an index controller in accordance with certain embodiments.

FIG. 2 illustrates further details of the index controller 140 in accordance with certain embodiments. The index controller 140 includes a trigger generator component 200, a placement component 210, index server manager memory map structures 220, and a shared file system monitor 230. The structures 220 include a placement map 222 and a virtual-index-epoch map 224. The placement map 222 is used to associate physical partitions with index servers 114, 124, 126, 134 and to associate the index servers 114, 124, 126, 134 with the file systems 162, 164. In certain embodiments, the virtual-index-epoch map 224 is in persisted form. In certain embodiments, the placement map 222 and the virtual-index-epoch map 224 are both in persistent form (e.g., as persistent, transactionally recoverable structures). In certain embodiments, the index server manager memory map structure 220 is one or more database tables. In certain other embodiments, the index server manager memory map structure 220 may be in ordinary files stored in the shared file systems 162, 164. In certain embodiments, the use of a DBMS 142 is optional and, instead of the DBMS 142, embodiments may use one or more standard file system files within the shared file system 162, 164 for persistence of the virtual-index-epoch map 224.

The trigger generator component 200 receives messages from node managers 110, 120, 130 and/or index servers 114, 124, 126, 134 containing performance metrics.

Figure 3:
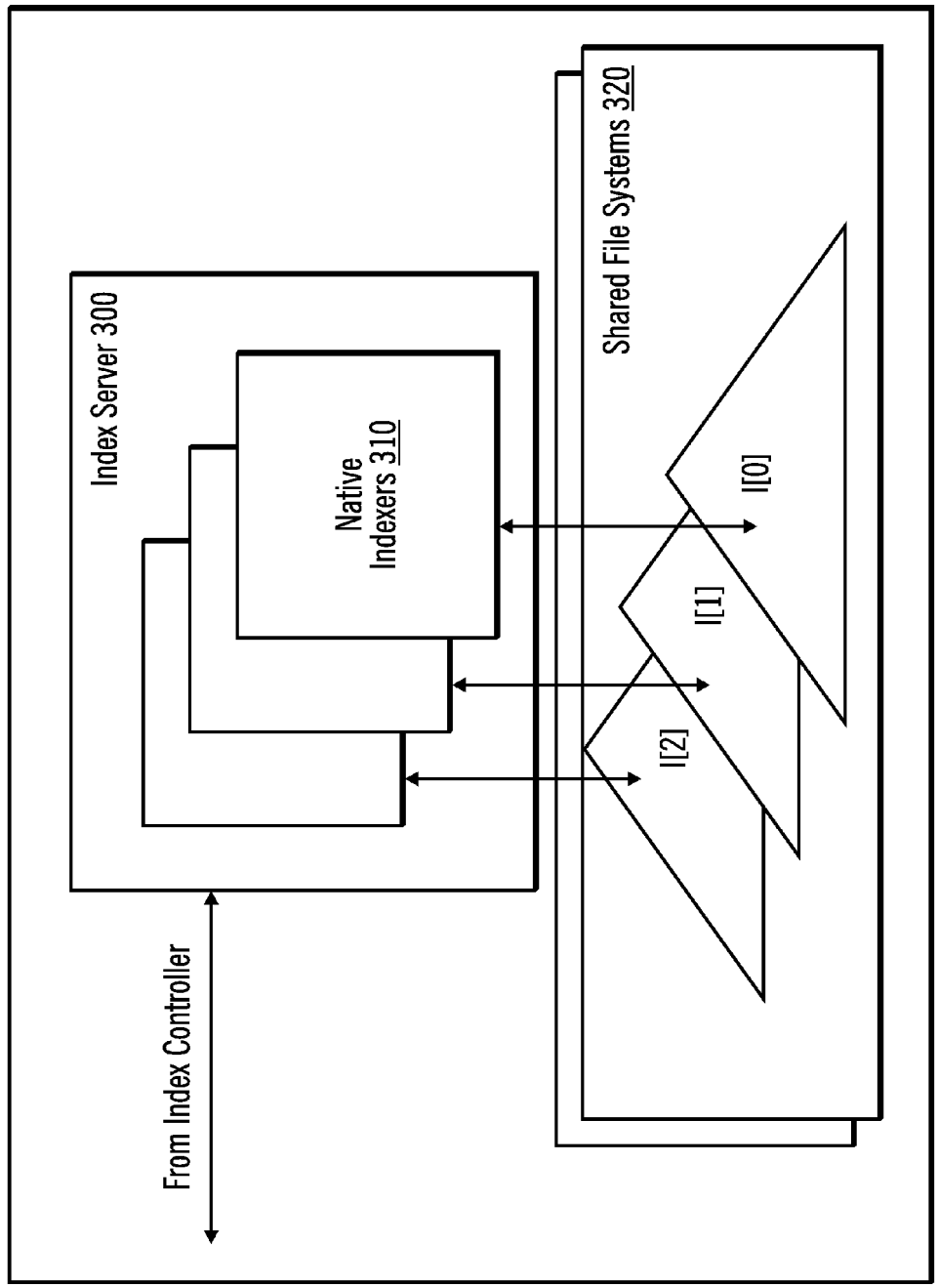
FIG. 3 illustrates further details of an index server in accordance with certain embodiments.

FIG. 3 illustrates further details of an index server 300 in accordance with certain embodiments. Index server 300 is a detailed example of index servers 114, 124, 126, 134. The index server 300 includes one or more native indexers (e.g., native indexers 310). Each native indexer 310 is associated with a physical partition I[0], I[1], I[2] in the shared file systems 320. The shared file systems 320 are an example of shared file systems 162, 164. In some embodiments, a native indexer may be a text indexing engine, such as the APACHE LUCENE™ search engine, the Zebra full text search engine, Onix etc. APACHE LUCENE is a trademark of the Apache Software Foundation in the United States and/or other countries. The APACHE LUCENE™ search engine is open source.

The shared file system 162, 164 is used to store the underlying persisted forms of the text index typically used by the specific text indexing engine (also called a native indexer in this discussion).

The following definitions are used herein:

1. Document—A document may be described as a logical sequence of words or tokens in any format. A document may be materialized by appropriate tokenization of a MICROSOFT™ word document, a Hypertext Markup Language (HTML) web page, a Portable Document Format (PDF) document, a raw text document, or a document in a host of other formats. MICROSOFT is a trademark of Microsoft Corporation in the United States and/or other countries.

2. Query—A query expresses the characteristics that a user or system is interested in. For instance, the query "John Doe" is considered to represent a user or system's interest in all documents containing the phrase "John Doe". There are several known syntaxes for expressing queries, including those used by public search engines, indexing software, and standard query languages, such as Extensible Markup Language (XML) Path Language (XPath). In embodiments, the query may be written in any query syntax.

3. Assigned-doc-ID—An assigned-doc-ID is generated for a document during creation. The document is addressed/identified by the assigned-doc-ID, which is a monotonically increasing, non-reusable unique identifier (e.g., a 64-bit integer). For example, monotonically addressable documents occur in the context of content management systems.

4. Physical partition (e.g., physical index)—A physical partition is managed by an index server and stored in a shared file system. Typically, the physical partition is an inverted list and may be used by any search engine.

5. Virtual Index—A virtual index is a single system view of all physical partitions.

6. Each index server is capable of tracking the state of the physical partitions it has been assigned. Each index server has a notion of what (or highest) assigned-doc-ID that has been persisted for each of those physical partitions. In some embodiments, the index controller 140 may query this state and reapply what the index controller 140 thinks was lost in flight due to network partitions/location failure, etc, for a specific physical partition it is attempting to process. In certain embodiments, the recovery system for each physical partition is managed by the local index server and each physical partition can recover independently by negotiating with the index controller using some form of write ahead logging of the CRUD operations in the index controller.

7. Virtual-index-epoch—A set of indexes that share the same range partition with a well known lower bound and upper bound. In certain embodiments, for the two-dimensional dynamic partitioned scheme, there is one active virtual-index-epoch. This set of indexes use the same partitioning scheme in the second dimension. The indexes within the virtual-index-epoch are logically numbered starting from 0.

8. Virtual-index-epoch transition—The act of transitioning to a new set of one or more indexes with a new lower bound assigned-doc-ID and infinity upper bound. This meets basic failure scenarios and is transactional with appropriate cleanup/restart recovery. Such a transition usually occurs when a capacity or throughput trigger is generated by the trigger generator.

9. Location—A node/host that has an independent CPU and memory resources and either uses shared file system storage 140 or isolated storage manifested as a file-system mounted at that node.

8. Placement Technique—Placement is a two part process consisting of the act of determining a location (e.g., node 13) to host one or more index server instances subsequent to optimally determining what physical partition subset will be hosted by the individual index servers. Placement techniques (e.g., bin packing or the knapsack problem for combinatorial optimization) are known to optimally place disjoint subsets of physical partitions into an optimal set of index servers that can then be placed across the nodes/locations in the cluster.

9. Placement Map 122.—The entire set of index server instances and their locations. Also the associated disjoint set of physical partitions hosted by each index server.

10. Trigger—There exist two types of triggers, either manually driven or autonomically driven by way of feedback and thresholds. Threshold values are derived from independent modeling. The type-1 trigger is associated with storage resources, document corpus limits, and memory availability within a node to sustain an index for a given number of documents, etc. The type-2 Trigger is typically a throughput trigger. The throughput trigger may be driven manually or autonomically, where the throughput disposition at an earlier virtual-index-epoch is determined from response behavior/history on inserts.

11. Index controller 140—The index controller 140 is the keeper of all distributed state, and the keeper of the persistent Create, Read, Update, and Delete (CRUD) queue. The index controller 140 also orchestrates the virtual-index-epoch transition.

Embodiments solve the problems with the current state of the art as follows:

a. An index is broken at birth on a continuous basis into a series of managed physical partitions that are more easily hosted within the HSIP 190 limits. The number of the physical partitions are autonomically managed to provide a transparent single virtual index view. That is, an application will believe that it is submitting a query to a single index, rather than a set of physical partitions.

b. A single system view or image is provided of the managed physical partitions so that applications are unchanged. That is, applications interacting with the index controller 140 are not aware of an index being separated into multiple physical partitions that happens transparently on a continuous basis. The management of virtual-index-epochs and the use of the mapping (via the use of the two-dimensional dynamic partitioning scheme, the map function and the group function) provides a mechanism to provide that single virtualized view of the physical partitioned indexes.

c. The size of the physical partitions is kept within a tolerable performance envelope, such that the overall virtual index has a predictable steady performance characteristic in the creation velocity and the search performance. This is achieved with the help of triggering an virtual-index-epoch of type-1 (i.e., capacity). Reasonable feedback mechanisms for size and term distributions are tied to this virtual-index-epoch of type-1.

d. The virtual index is managed autonomically, providing a single system view or image to the applications, using a two-dimensional dynamic partitioning scheme. This provides a single system view or a virtualized index over the multiple underlying physical partitions with an internal monotonic sequenced document ID that is range partitioned in the first dimension and a user defined or load defined open partitioning scheme in the second dimension for each range. A row in the two-dimensional dynamic partitioned scheme represents a virtual-index-epoch, which can be triggered autonomically. The triggers in the first dimension are typically fired on capacity. The triggers in the second dimension are typically fired based on throughput demands. The virtualized view provides the transparency to the hosting application in these dimensions of scaling out or up the physical partitioned indexes. The virtual-index-epoch provides means to evaluate and dynamically reconfigure the number of indexes required to sustain a steady state performance. In certain embodiments, the reconfiguration may be a new set of physical partitions added or even removed or even older indexes in earlier virtual-index-epoch being merged up without loss of CRUD or query service at the virtual index level.

FIG. 4 illustrates logic performed by the index controller 140 for a virtual-index-epoch transition. FIG. 4 is formed by FIGS. 4A, 4B, 4C, and 4D. Control begins in block 400 with the index controller 140 receiving a virtual-index-epoch transition trigger. The trigger may be type-1 or type-2. The trigger may be manual or automatic. That is, the trigger can be fired atomically or with the trigger generator component 200. The trigger generator component 200 uses feedback and threshold based schemes to generate the trigger. Alternatively, the trigger can be fired manually by way of an administrative, designated command.

In block 402, the index controller 140 determines an action from reviewing statistics such as CPU usage, memory usage, and or other relevant statistics about the node collected from the node managers delivered by way of a Remote Procedure Call (RPC). In various embodiments, the shared file system monitor 212 continuously and/or periodically monitors the size and usage of the shared file systems, and other policies expressed as rule sets. The actions may include performing load balancing. For example, for type 1 triggers, the actions may be to add another index server or have an existing index server process two physical partitions instead of three physical partitions. In block 404, the index controller 140 determines whether a virtual-index-epoch transition is in progress. If so, the index controller 140 waits, otherwise, the index controller 140 continues to block 406.

In block 406, the index controller 140 determines whether all query sessions and CRUD sessions to the index controller 140 have completed current operations and the gate can be acquired. This involves acquiring a gate such that no other operation can proceed. If the gate is not available, the index controller 140 continues to block 408, otherwise, the index controller 140 waits till all open sessions rendezvous and wait at the gate. This allows the virtual-index-epoch transition to get exclusive rights to alter the appropriate map structures.

Figure 4A:
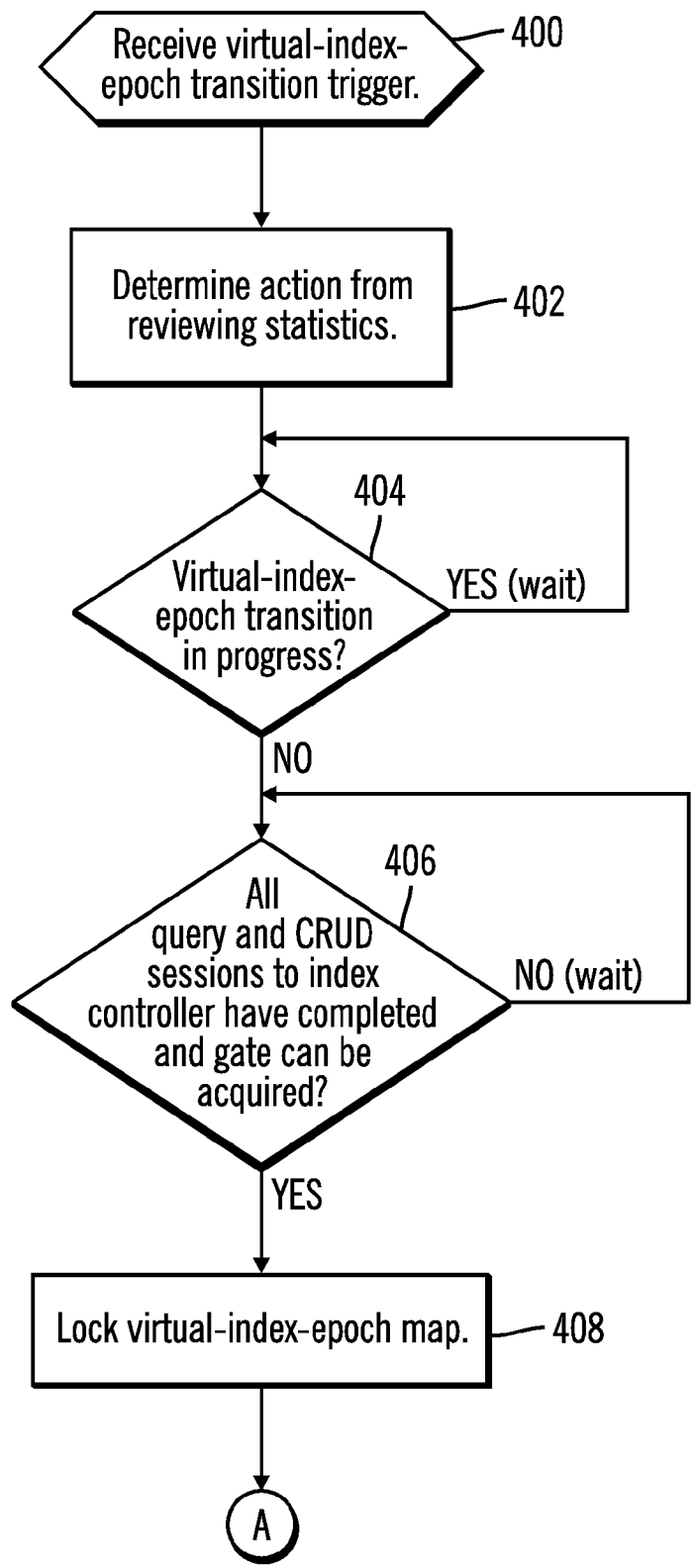
FIG. 4 illustrates logic performed by an index controller for a virtual-index-epoch transition.
Figure 4B:
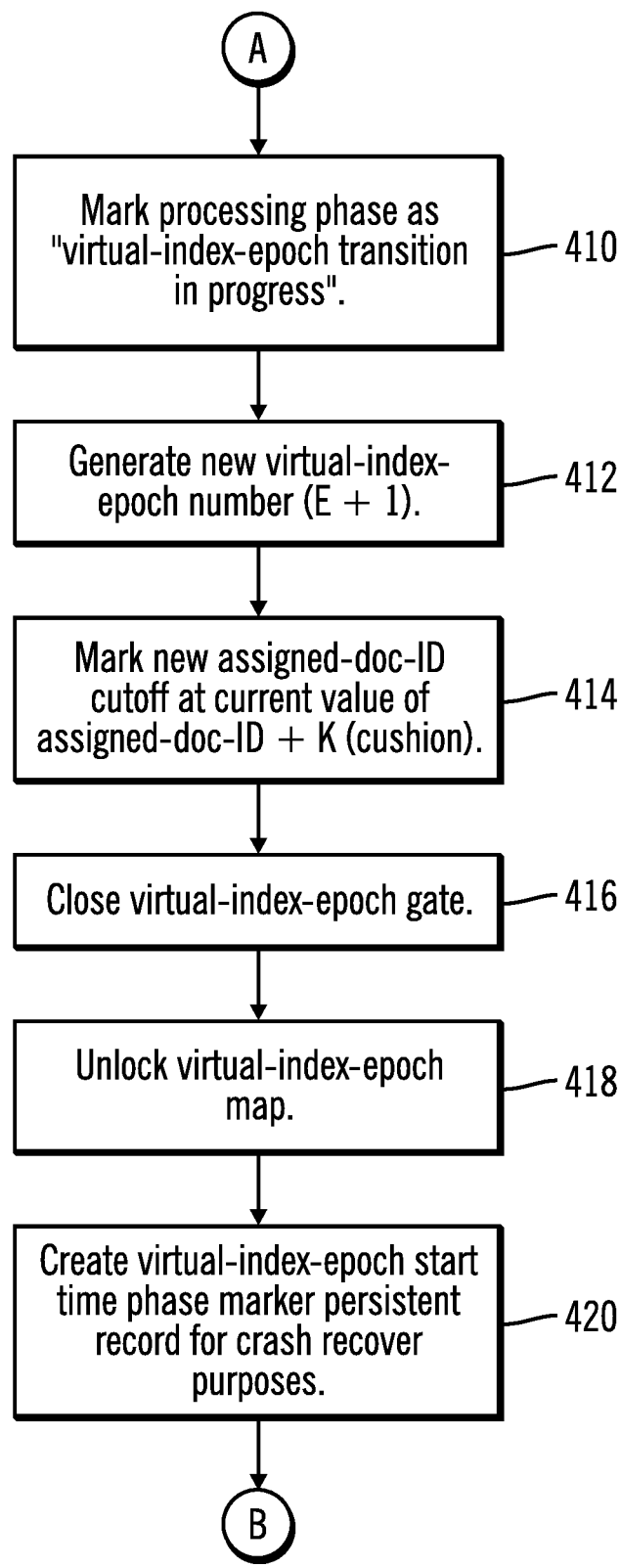

In block 408, the index controller locks the virtual-index-epoch map 224 (i.e., closes the virtual-index-epoch gate). From block 408 (FIG. 4A), processing continues to block 410 (FIG. 4B). In block 410, the index controller 140 marks the processing phase as "virtual-index-epoch transition in progress". This is an in memory flag to synchronize the CRUD and query sessions with and virtual-index-epoch transition. In block 412, the index controller 140 generates a new virtual-index-epoch number (E+1). In block 414, the index controller 140 marks the new assigned doc-ID cutoff at a current value of the assigned-doc-ID+K (cushion). This cushion K is specified to provide a means to not block the other CRUD and query sessions that can occur while a virtual-index-epoch transition is occurring. The cushion permits the insert/create CRUD operations to proceed for a certain amount of time without blocking at the gate. This cushion is tuned to absorb the typical time taken for a virtual-index-epoch transition to occur to completion. In some embodiments the cushion is dynamically tuned based on the average time for a virtual-index-epoch transition to occur. In certain embodiments, a cut-off is described as the current assigned-doc-ID plus the cushion. That is, the cushion refers to having a cut-off of assigned-doc-IDs that are determined not too far out so as to cause a violation of a type-1 trigger. With cushions, thresholds that fire type-1 triggers leave sufficient pad to deal with incoming create operations to indexes in an earlier virtual-index-epoch that caused the type-1 trigger in the first place.

In block 416, the index controller 140 closes the virtual-index-epoch gate. In block 418, the index controller 140 unlocks the virtual-index-epoch map 224. In block 420, the index controller 140 creates a virtual-index-epoch start time phase marker persistent record for crash purposes. This involves persisting a record into the DBMS 142 to mark a start phase of the virtual-index-epoch transition. This is done so that, in case a crash occurs, the HSIP 190 can recover by detecting the said persisted record, seeing that the virtual-index-epoch did not complete and rolling back the incomplete virtual-index-epoch transition operations that may have occurred partially.

Figure 4C:
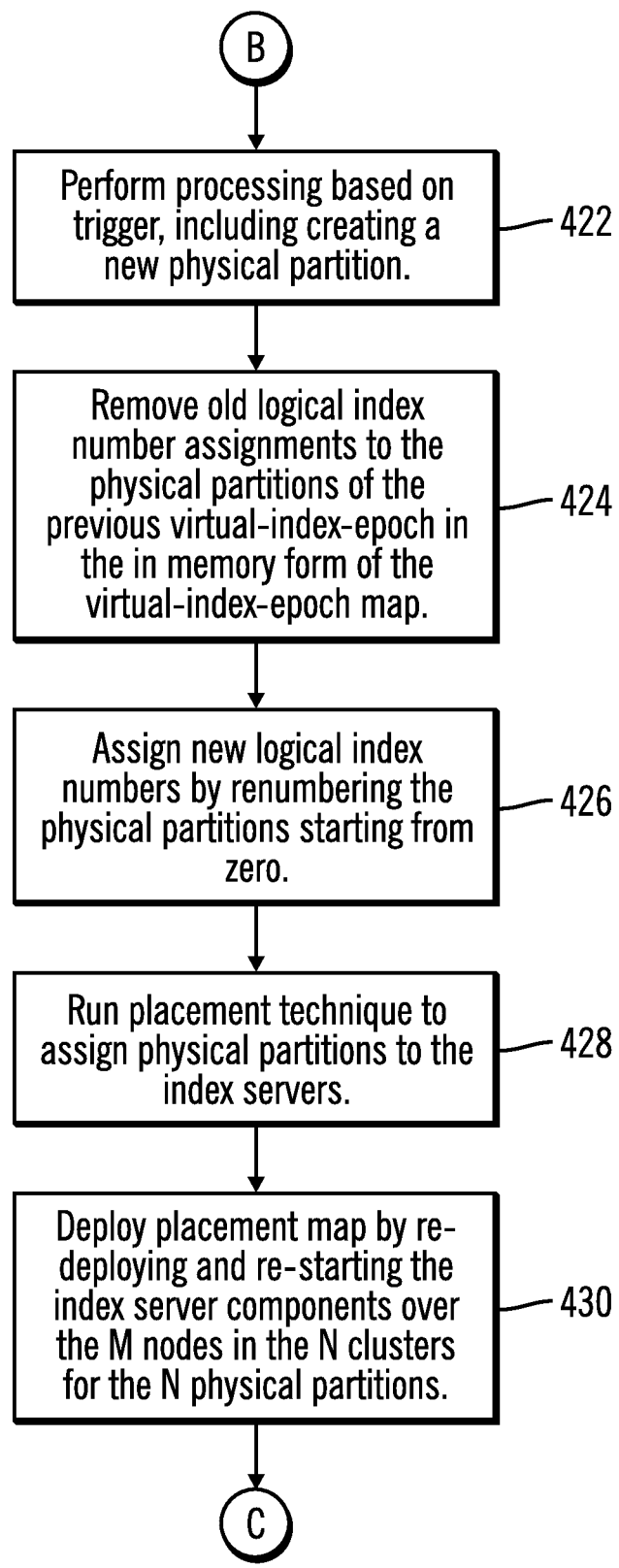

From block 420 (FIG. 4B), processing continues to block 422 (FIG. 4C). In block 422, the index controller 140 performs processing based on the trigger, including creating a new physical partition. For example, if the trigger is due to storage, then, in block 422, the index controller 140 determines free storage within the shared file systems 162, 164 and obtains a path to the free storage. Then, the index controller 140 then prepares and initializes a new base text index at the obtained path. The act of preparing and initializing a new base text index depends on the choice of the native indexer in use. The index controller 140 also assigns a physical partition number I[x] to the newly materialized index. The HSIP 190 then persists a physical partition record in the DBMS that is used to track the newly created physical partition. This record will include the assigned physical partition number and other aspects like its storage path within the shared file system.

In block 424, in accordance with certain embodiments, the index controller 140 removes the old logical index number assignments to the physical partitions of the previous virtual-index-epoch in the in memory form of the virtual-index-epoch map 224. In such embodiments, a previous virtual-index-epoch that was current at some point in time in history has physical partitions that have some logical numbers attached to them. When brought forward to the new virtual-index-epoch, all physical partitions, including one or more new physical partitions that may be deemed necessary based on the trigger, are renumbered with new logical index numbers. In block 426, the index controller 140 assigns new logical index numbers by renumbering the physical partitions starting from zero. In block 428, the index controller 140 runs a placement technique (e.g., bin packing) to assign the physical partitions to the index servers 114, 124, 126, 134. In block 430, the index controller 140 deploys a placement map 222 by re-deploying and re-starting the index servers 114, 124, 126, 134 over the M nodes 110, 120, 130 in the N clusters for the N physical partitions.

Figure 4D:
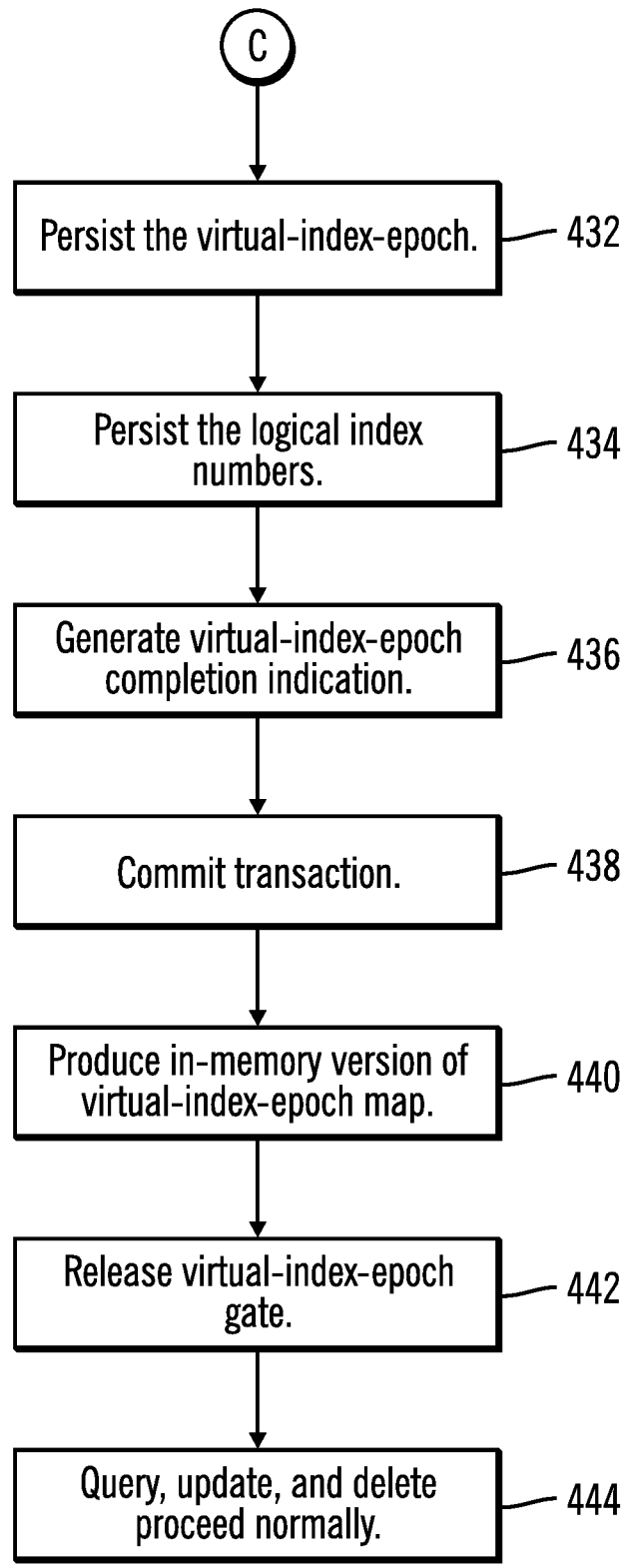

From block 430 (FIG. 4C), processing continues to block 432 (FIG. 4D). In block 430, the index controller 140 persists the virtual-index-epoch. In block 434, the index controller 140 persists the logical index numbers. In block 436, the index controller 140 generates a virtual-index-epoch completion indication (e.g., a record). In block 438, the index controller 140 commits the transaction. In block 440, the index controller 140 produces a new in-memory version of the virtual-index-epoch map 224. In block 442, the index controller 140 releases the virtual-index-epoch gate. Then, query, update, and delete proceed normally (block 444). Thus, after a virtual-index-epoch transition, a new virtual-index-epoch map 224 is created in memory, and the virtual-index-epoch map 224 is also persisted. In certain embodiments, the act of persisting and writing the completion record is done in one transaction to have the right recovery semantics.

In certain embodiments, a virtual-index-epoch transition does not stop create operations at the index controller 140.

Figure 5A:
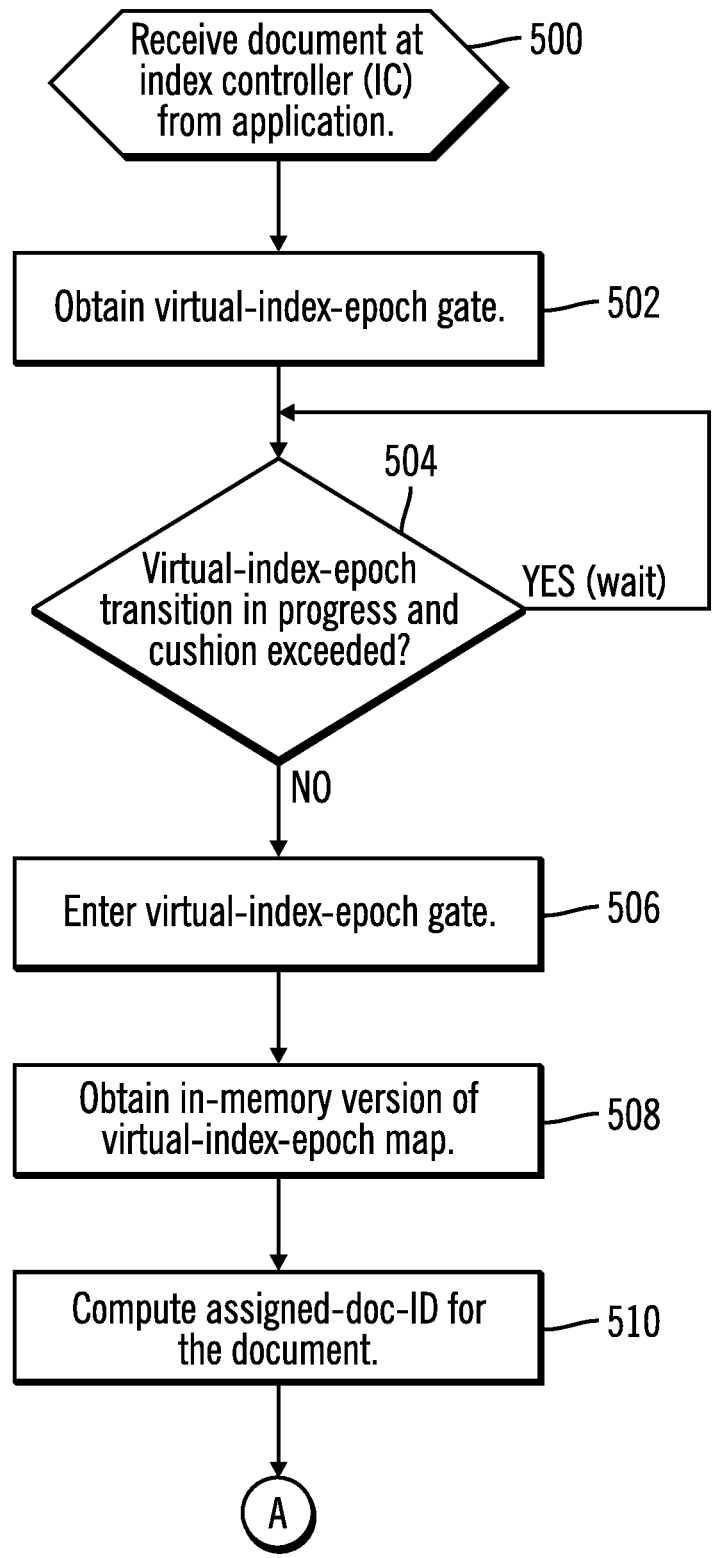
FIG. 5 illustrates logic performed by an index controller for a create operation in accordance with certain embodiments.
Figure 5B:
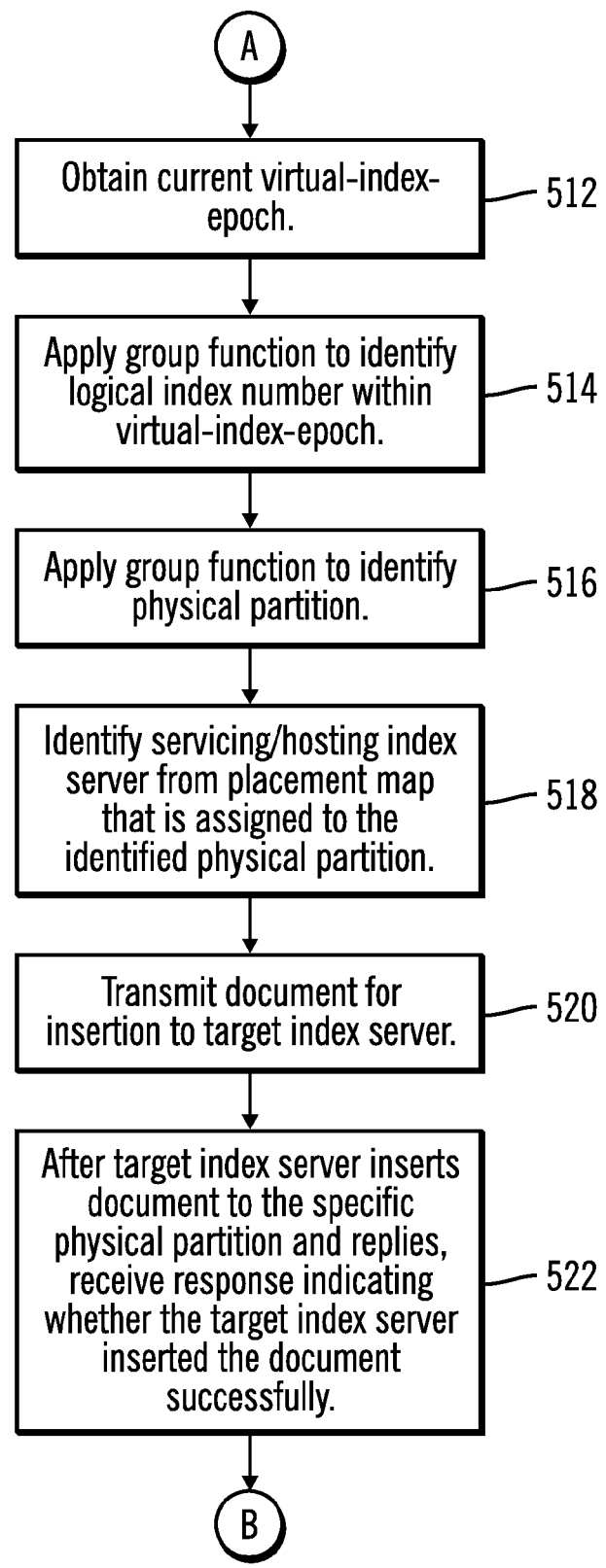
Figure 5C:
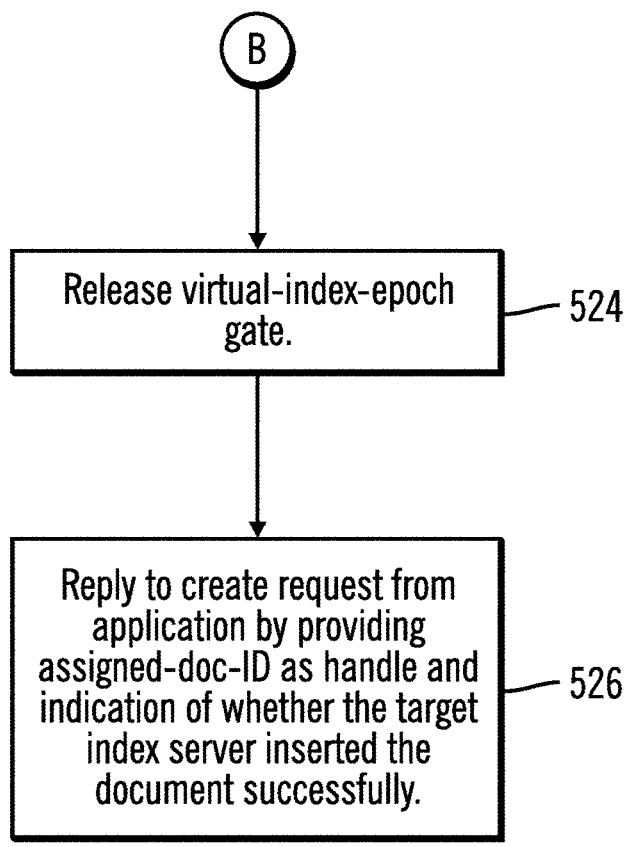

FIG. 5 illustrates logic performed by the index controller 140 for a create operation in accordance with certain embodiments. FIG. 5 is formed by FIGS. 5A, 5B, and 5C. Control begins in block 500 with the index controller 140 receiving a document from the application 100. In block 502, the index controller 140 obtains the virtual-index-epoch gate. In block 504, the index controller 140 determines whether a virtual-index-epoch transition is in progress and the cushion is exceeded. If so, the index controller 140 waits, otherwise, the index controller 140 proceeds to block 506. In block 506, the index controller 140 enters the virtual-index-epoch gate. In block 508, the index controller 140 obtains the in-memory version of the virtual-index-epoch map 224. In block 510, the index controller 140 computes an assigned-doc-ID for the document. The computation is fundamentally to uniquely and atomically increment a global integer counter that is persisted in the database or, in some embodiments, within the shared file system. The value of that counter is provided as the assigned-doc-ID for the create/insert operation.

From block 510 (FIG. 5A), processing continues to block 512 (FIG. 5B). In block 512, the index controller 140 obtains a current virtual-index-epoch. This is obtained by finding the highest numbered virtual-index-epoch within the virtual-index-epoch map 224. In block 514, the index controller 140 then applies a group function to identify the logical index number within the virtual-index-epoch. In block 516, the index controller 140 applies the group function to identify the physical partition (e.g., one of I[0], I[1], I[2], I[3]). That is, the index controller 140 uses the virtual-index-epoch map 224 and the group function to obtain the final physical partition number from the virtual-index-epoch map 224 and the associated index server that is hosting the physical partition from the placement map 222. In block 518, the index controller 140 identifies a servicing/hosting index server 114, 124, 126, 134 from the placement map 222 that is assigned to host and manage the identified physical partition. This identified index server could be one of 114, 124, 126, 134 and is also referred to as the target index server. In block 520, the index controller 140 transmits the document for insertion to the target index server which could any one of 114, 124, 126, 134 (e.g., via some form of a Remote Procedure Call (RPC)) over the network. For example, the target index server, on receipt of the insertion operation and document from the index controller 140, proceeds to insert the document to the specific physical partition which could be one of I[0], I[1], I[2], I[3] of shared file systems 320 in FIG. 3. Subsequently the target index server responds back to the index controller with a success or failure. In block 522, the index controller 140 receives a response from the target index server which could be one of 114, 124, 126, 134 indicating whether the target index server inserted the document successfully.

From block 522 (FIG. 5B), processing continues to block 524 (FIG. 5C). In block 524, the index controller releases the virtual-index-epoch gate. In block 526, the index controller 140 replies to the create request from the application 100 by providing the assigned-doc-ID as a handle and an indication of whether the identified target index server inserted the document successfully. The application 100 can then make further subsequent requests for this document using the assigned-doc-ID.

FIG. 6 illustrates a logical view of a table 600 showing four virtual-index-epoch transitions resulting in five virtual-index-epochs in accordance with certain embodiments. In table 600, '*' indicates a current virtual-index-epoch. The downward row direction indicates resource scaling or virtual-index-epochs that occurred due to type-1 triggers in the past, and the horizontal columns direction indicates a throughput scaling that occurred in the past by way of type-2 triggers. I[x1,x2] refers to a physical partition where x1 corresponds to virtual-index-epoch number and x2 is the logical index number assigned to the physical partition within that virtual-index-epoch. In this logical view a general partition function for each virtual-index-epoch can be specified and is appropriately part of the information associated with the specific virtual-index-epoch.

In FIG. 7, which is an example of a persisted virtual-index-epoch map in accordance with certain embodiments, each row represents a virtual-index-epoch. For each row, there is an virtual-index-epoch number, a range minimum, a range maximum, and a range modulo. The range modulo represents the number of logical indexes within the virtual-index-epoch. For each virtual-index-epoch, the number of logical indexes depends on the triggers based on capacity and/or throughput. The logical indexes may map to physical partitions materialized in earlier virtual-index-epochs and possibly one or more new physical partitions. This table represents a point in time where 5 virtual-index-epoch transitions have already occurred and the 6th one is the current one. The current virtual-index-epoch (having ID 6) is the last virtual-index-epoch in the map structure 700. The current virtual-index-epoch (having ID 6) has a minimum range of 5748, based on the maximum range of the previous virtual-index-epoch (having ID 5) and has a maximum range of infinity as the maximum is not know at creation time of the virtual-index-epoch. The values in the range minimum and range maximum columns may approximately represent the number of assigned-doc-IDs for the life time of that virtual-index-epoch when it was current. The reason for this is that for greater currency and the use of a cushion does not necessitate that the assigned-doc-IDs handed to the application out for each document insert will be densely monotonic or contiguously monotonic, there may be gaps.

FIG. 8 illustrates a group structure 800 and use of an example group function in accordance with certain embodiments. In certain embodiments, the group structure 800 is a table. In certain embodiments, map structure 700 and group structure 800 are tables and, together, they may be considered to represent the virtual-index-epoch map 224.

In FIG. 8, structure 800 has a column for a virtual-index-epoch number, a column for a group identifier, and a column for a physical partition number. This structure represents an example of the persisted form of the group function that provides a way to determine the physical partition number from the logical index number. Other embodiments may incorporate a three column table containing an virtual-index-epoch number, a logical index number and a physical partition number as an alternate way to achieve a simple logical index number mapping to a physical partition number.

In certain embodiments, the index controller 140 computes the virtual-index-epoch using a binary search of table 700, where the virtual-index-epoch of a document ID is based on the sorted unique interval determined from the range minimum and range maximum that contains the assigned-document-ID (max is included, min is excluded). For example, for each function virtual-index-epoch(document ID)=virtual-index-epoch number and with reference to table 700: virtual-index-epoch(96)=1, virtual-index-epoch(3097)=5, virtual-index-epoch(699)=3, virtual-index-epoch(6098)=6.

Then, using table 700, the index controller 140 computes the map function (e.g., map(document ID)) using the virtual-index-epoch value and a hash function. For example if hash (x)=x, then, for a document ID of 2000:

$$\text{map}(2000) = 3 + 2 + 4 + \text{hash}(2000)\%6 = 11$$

$$= 3 + 2 + 4 + 2000\%6 = 11$$

For the map example of map(2000), the values of 3, 2, and 4 represent the range modulos ("mods") of prior virtual-index-epochs in table 700, the percent represents modulo, virtual-index-epoch 6 represents the current virtual-index-epoch, and the result (i.e., 11 in this example) is the logical partition.

In certain embodiments, structure 800 is implemented as a lookup table. In certain embodiments, the mapping from logical partition to physical partition is done using the group function. For example, for a document ID of 2000, for the group function lookup (map(2000))=lookup (11)=3. Thus, the document with document ID 2000 is stored in physical partition 3.

Figure 9A:
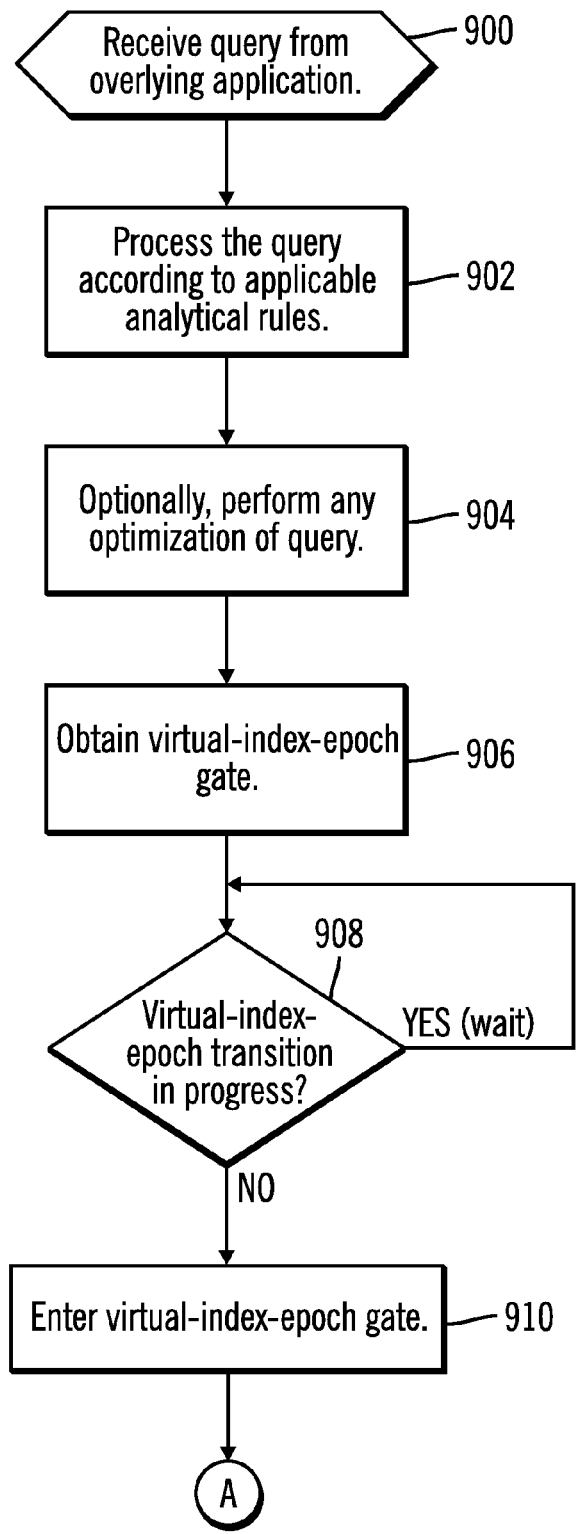
FIG. 9 illustrates logic performed by an index controller to process a query in accordance with certain embodiments.
Figure 9B:
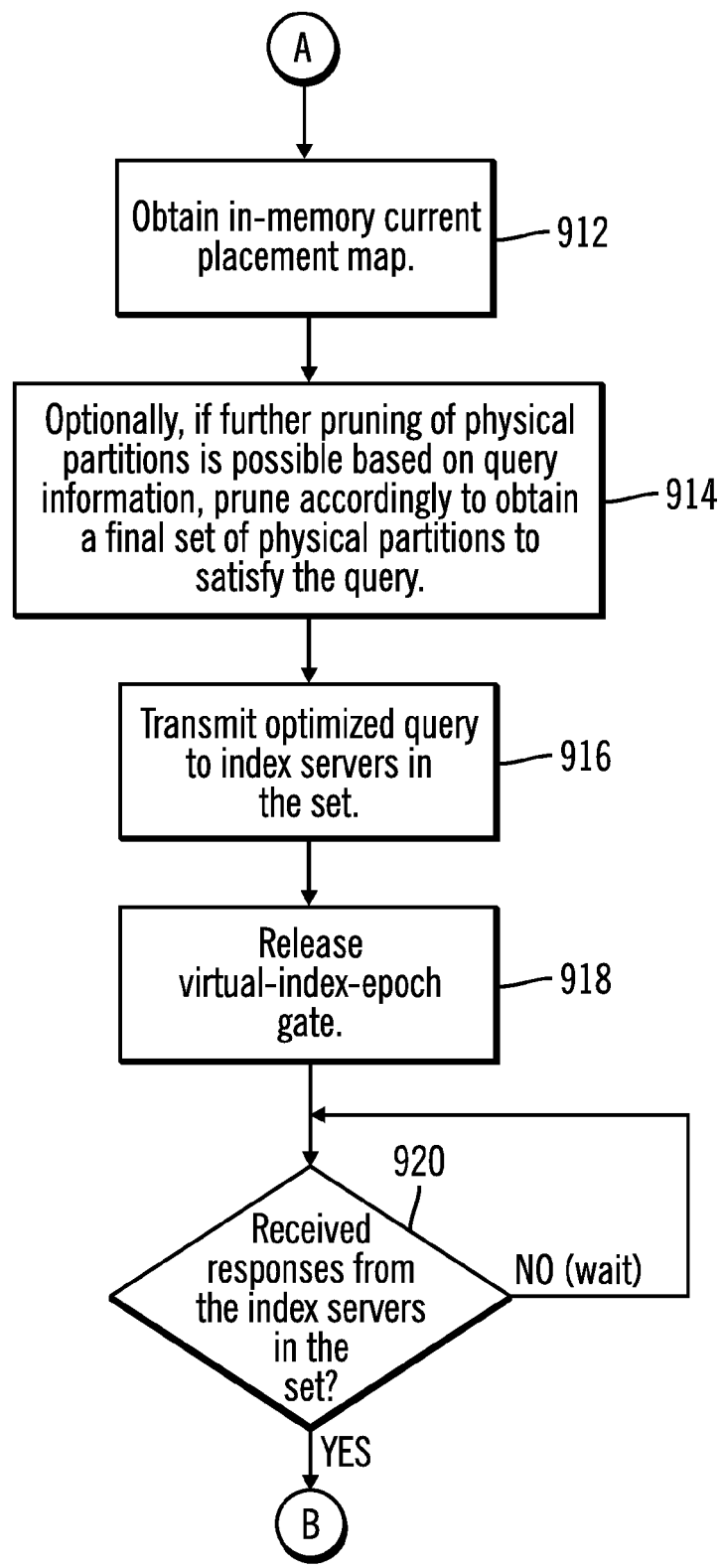
Figure 9C:
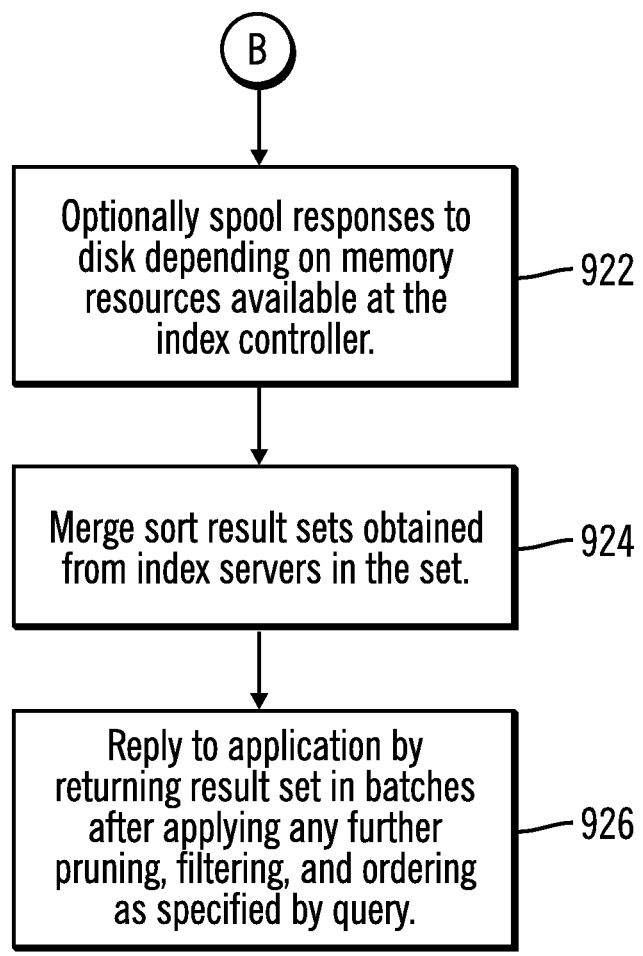

FIG. 9 illustrates logic performed by the index controller 140 to process a query in accordance with certain embodiments. FIG. 9 is formed by FIGS. 9A, 9B, and 9C. Control begins at block 900, with the index controller 140 receiving a query (e.g., a query string) from the overlying application. The HSIP processes a query in a computer processable form, and one such a form is a query string. So processing a query from the application may include taking the query in string form and performing certain operations on the query string as described. For ease of reference "query" will be used herein, with the understanding that certain embodiments may receive the query as a "query string". In block 902, the index controller 140 processes the query according to applicable analytical rules (e.g., stemming, rewrite, keyword substitution etc.). In block 904, the index controller 140 optionally performs any optimization of the input query. In certain embodiments, the optimization is performed using standard methods by first converting the query to a specific form for analyses. Then, it is assumed that the query would have to be satisfied by querying all possible physical partitions in the physical partition set and subsequently the pruning is performed by inspecting any associated predicates of the query to eliminate certain physical partitions within the physical partition set. In block 906, the index controller 140 obtains the virtual-index-epoch gate. In block 908, the index controller 140 determines whether a virtual-index-epoch transition is in progress. If so, the index controller 140 waits, otherwise, the index controller 140 continues to block 910. In block 910, the index controller 140 enters the virtual-index-epoch gate.

From block 910 (FIG. 9A), processing continues to block 912 (FIG. 9B). In block 912, the index controller 140 obtains the in-memory current placement map 222 from which the index controller 140 obtains the index servers and their corresponding node locations associated with the final set of physical partitions to satisfy the query. In block 914, optionally, if further pruning of the physical partitions is possible based on query information, the index controller 140 prunes accordingly to obtain a final set of physical partitions that are required to be queried I[x1, x2, . . . ]. Subsequently by consulting the placement map 222 and this final physical partitions, a set of relevant index servers IS[y1,y2, . . . ] hosting the physical partitions I[x1, x2, . . . ] is computed.

Figure 10:
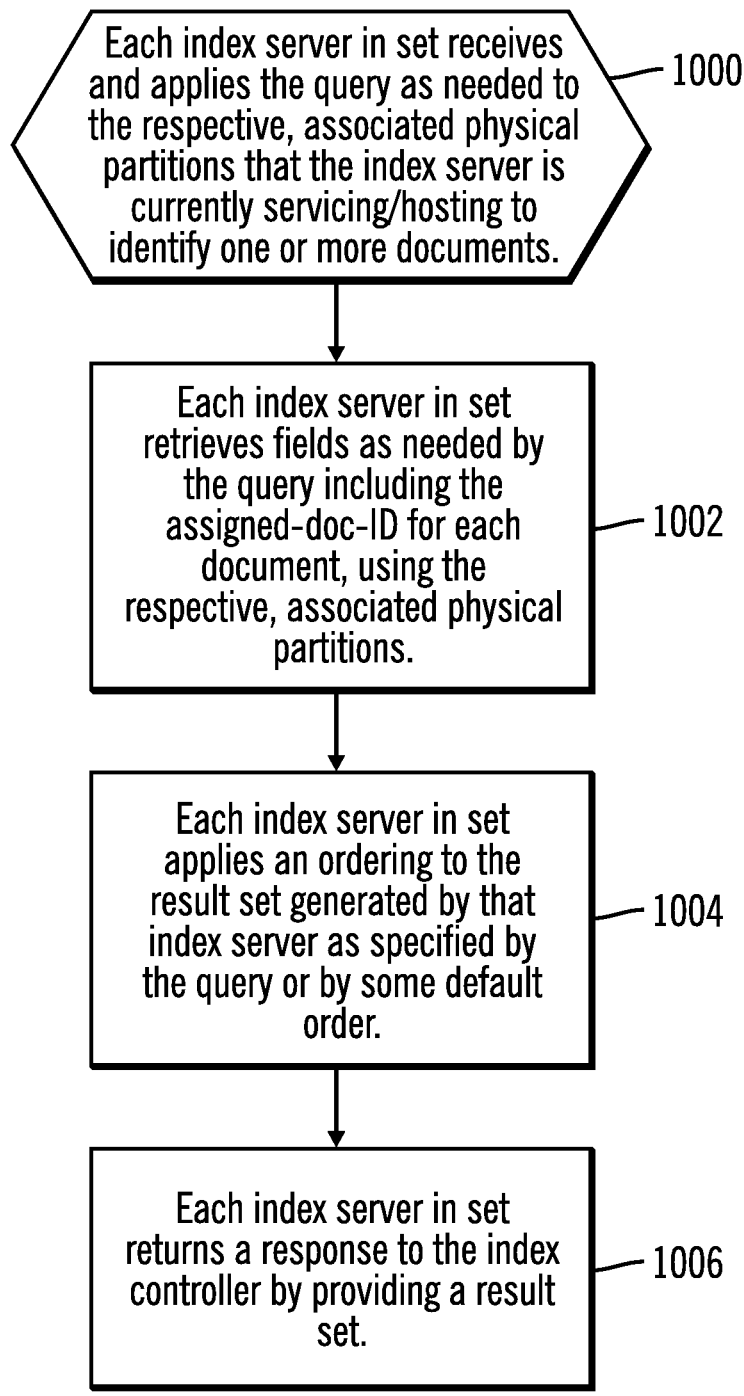
FIG. 10 illustrates logic performed by each index server in a set to return a result set in accordance with certain embodiments.

In block 916, the index controller 140 transmits the optimized query to the index servers in the set (e.g., some subset of index servers 114, 124, 126, 134). FIG. 10 illustrates the logic performed by the index servers in the set. In block 918, the index controller 140 releases the virtual-index-epoch gate. In block 920, the index controller 140 determines whether responses have been received from all the index servers in the set. If so, processing continues to block 922, otherwise, the index controller 140 waits.

From block 920 (FIG. 9B), processing continues to block 922 (FIG. 9C). In block 922, the index controller 140 optionally spools responses to disk depending on memory resources available at the index controller 140. In block 924, the index controller 140 merge sorts the result sets obtained from the index servers in the set. In block 926, the index controller 140 replies to the application 100 by returning the result set in batches, after applying any further pruning, filtering, and ordering, as specified by the query.

FIG. 10 illustrates logic performed by each index server in a set (e.g., one of the index servers in the relevant set 114, 124, 126, 134) to return a result set in accordance with certain embodiments. In block 916, the index controller 140 transmits a query to index servers in the set, and, in 1000, the index servers in that set receive and apply that query. Control begins in block 1000 with each index server receiving and applying the query as needed to the respective, associated physical partitions that the index server is currently servicing/hosting to identify one or more documents. In block 1002, each index server in the set retrieves fields as needed by the query, including the assigned-doc-ID for each document, using the respective, associated physical partitions. In block 1004, each index server in the set applies an ordering to the result set generated by that index server as specified by the query or by some default ordering. In block 1006, each index server in the set returns a response to the index controller 140 by providing a result set. In FIG. 920, the index controller 140 is waiting for this response from the index servers in the set.

Figure 11A:
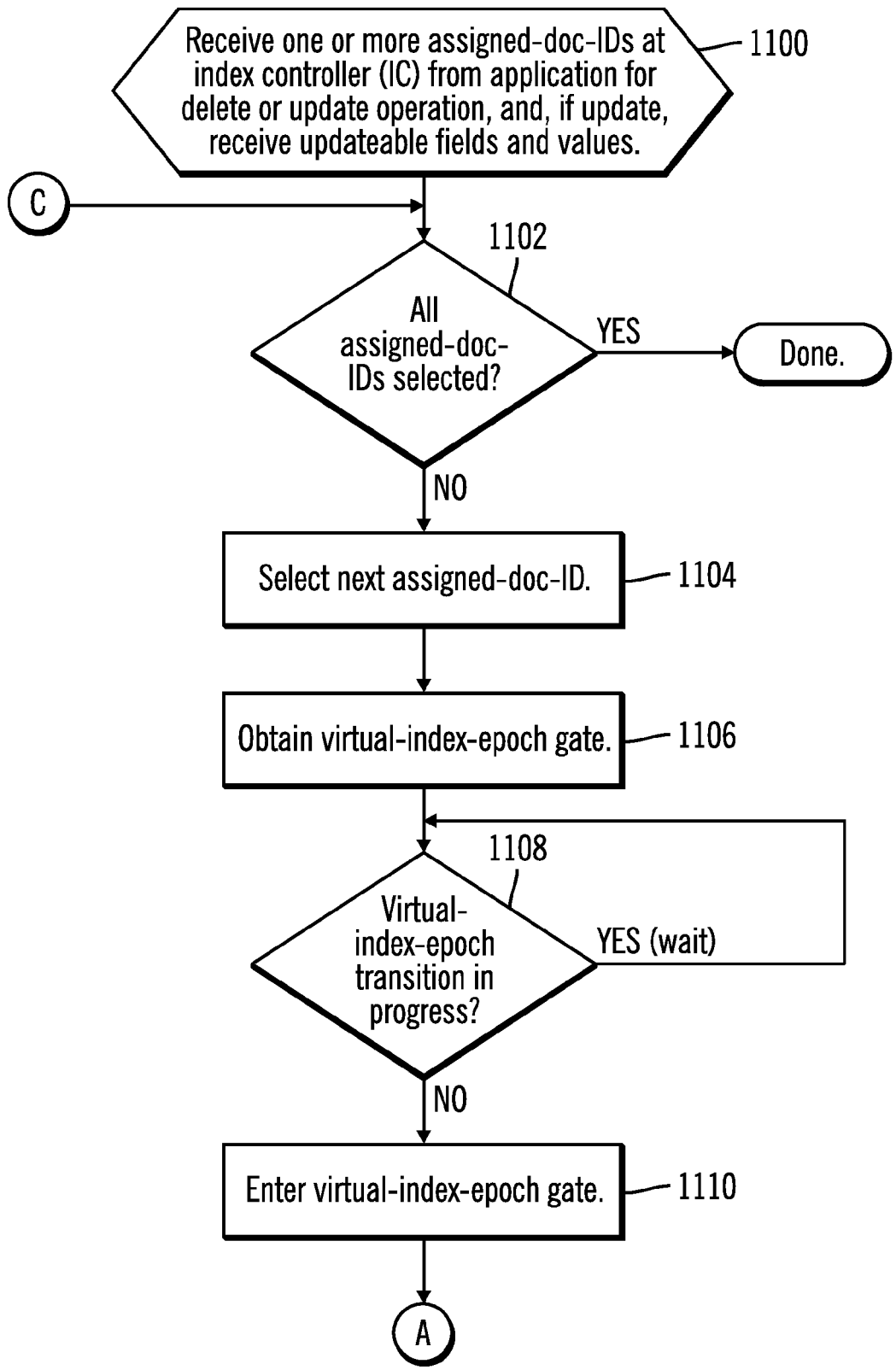
FIG. 11 illustrates logic performed by an index controller to process delete and update operations in accordance with certain embodiments.
Figure 11B:
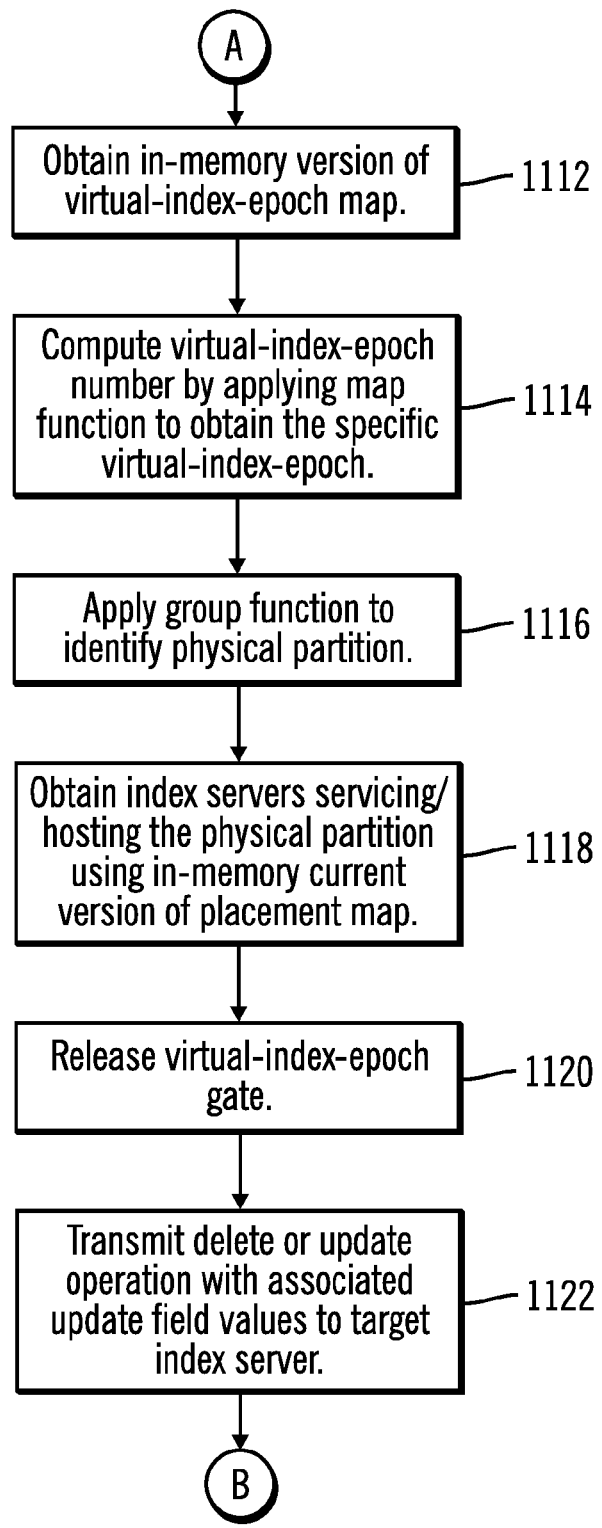
Figure 11C:
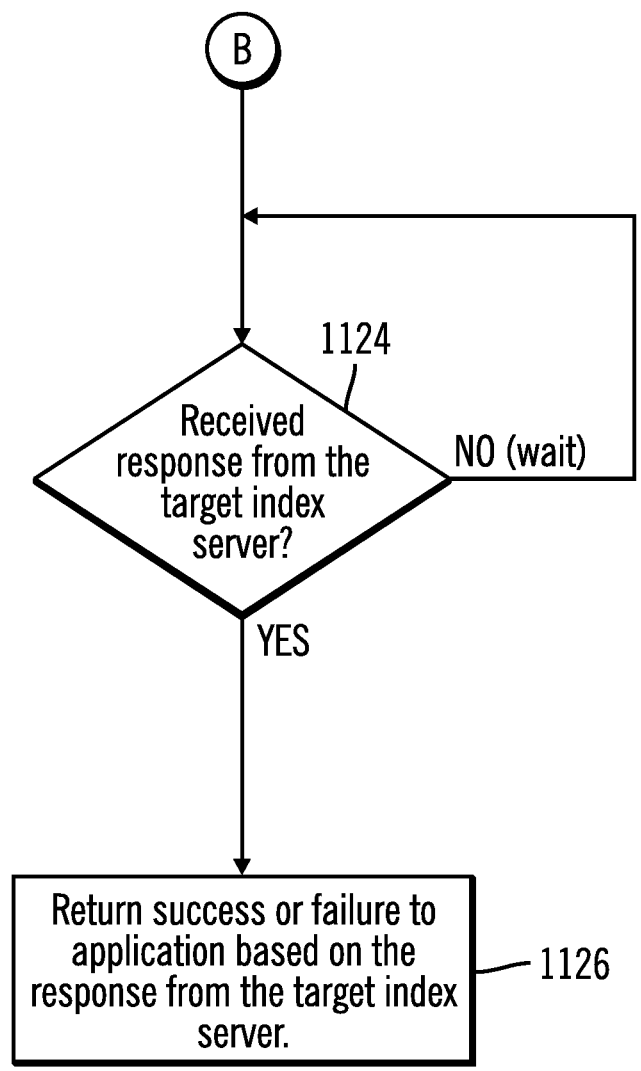

FIG. 11 illustrates logic performed by the index controller 140 to process delete and update operations in accordance with certain embodiments. FIG. 11 is formed by FIGS. 11A, 11B, and 11C. Control begins in block 1100 with the index controller 140 receiving one or more assigned-doc-IDs from the application 100 for a delete operation or an update operation, and, if the operation is an update operation, receiving updateable fields and values. In block 1102, the index controller 140 determines whether all assigned-doc-IDs have been processed. If so, processing is done, otherwise, processing continues to block 1104. In block 1104, the index controller 140 selects the next assigned-doc-ID. In block 1106, the index controller 140 obtains the virtual-index-epoch gate. In block 1108, the index controller 140 determines whether a virtual-index-epoch transition is in progress. If so, the index controller 140 waits, otherwise, the index controller 140 continues to block 1110. In block 1110, the index controller 140 enters the virtual-index-epoch gate.

Figure 12:
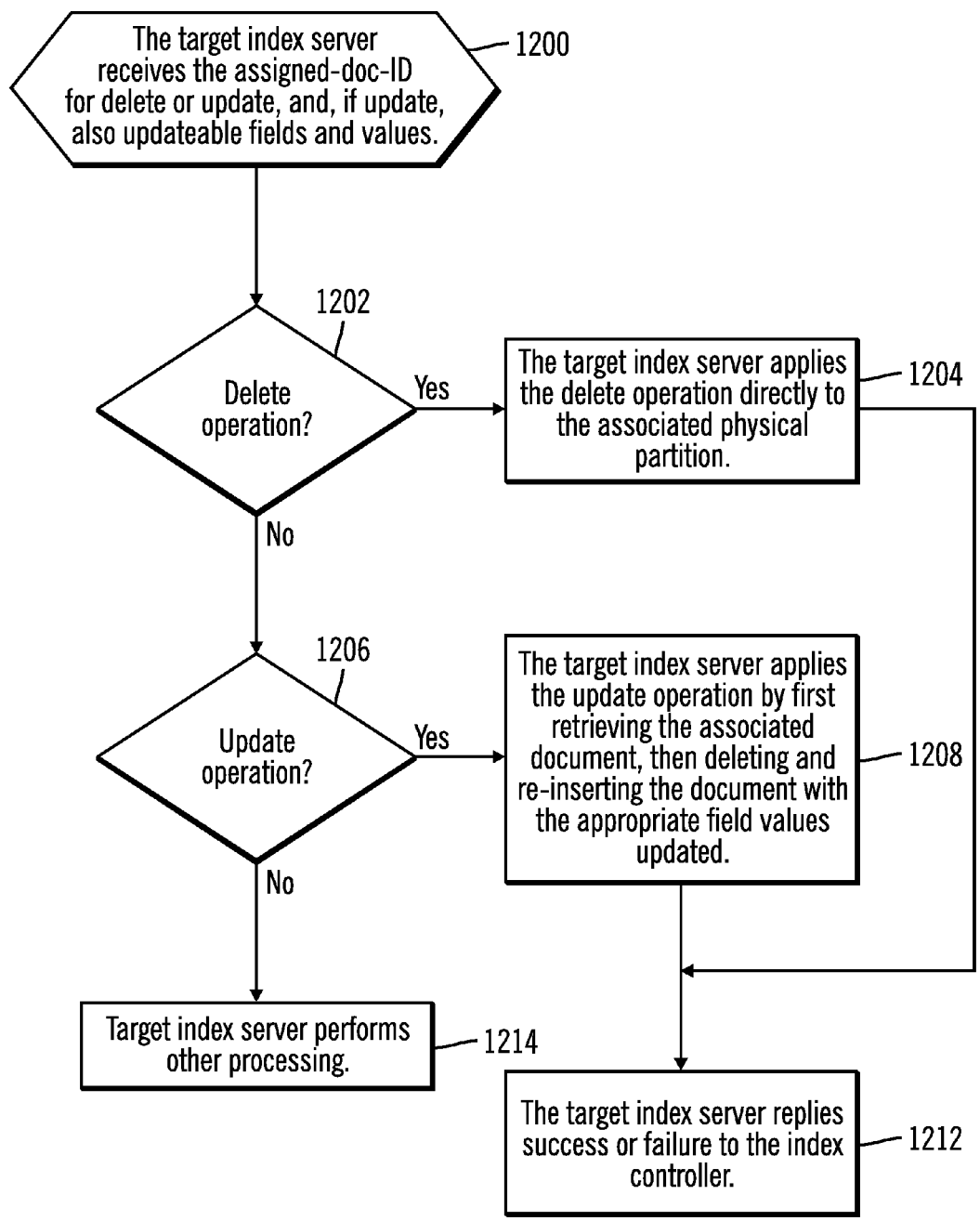
FIG. 12 illustrates logic performed by the target index server.

From block 1110 (FIG. 11A), processing continues to block 1112 (FIG. 11B). In block 1112, the index controller 140 obtains the in-memory version of the virtual-index-epoch map 224. In block 1114, the index controller 140 computes the virtual-index-epoch number by applying the map function to obtain the specific virtual-index-epoch 1114. In block 1116, the index controller 140 applies the group function to identify the physical partition. In block 1118, the index controller 140 identifies the index servers servicing the physical partition using the in-memory current version of the placement map 222. In block 1120, the index controller 140 releases the virtual-index-epoch gate. In block 1122, the index controller 140 transmits the delete operation or the update operation with associated update field values to the target index server (e.g. one of index servers 114, 124, 126, 134). FIG. 12 illustrates logic performed by the target index server.

From block 1122 (FIG. 11B), processing continues to block 1124 (FIG. 11C). In block 1124, the index controller 140 determines whether a response has been received from the target index server. If so, processing continues to block 1126, otherwise, the index controller 140 waits. In block 1126, the index controller 140 returns success or failure to the application 100 based on the response from the target index server.

FIG. 12 illustrates logic performed by a target index server (e.g. one of index servers 114, 124, 126, 134) to process a delete operation or an update operation in accordance with certain embodiments. Control begins in block 1200 with the target index server receiving the assigned-doc-ID for the delete operation or the update operation, and, if the operation is an update operation, receiving updateable fields and values. In block 1212, the target index server determines whether this operation is a delete operation. If so, processing continues to block 1204, otherwise, processing continues to block 1206. In block 1204, the target index server applies the delete operation directly to the associated physical partition. From block 1204, processing continues to block 1212.

In block 1206, the target index server determines whether this operation is an update operation. If so, processing continues to block 1208, otherwise, processing continues to block 1214. In block 1208, the target index server applies the update operation by first retrieving the associated document, then deleting and re-inserting the document with the appropriate field values updated. From block 1208, processing continues to block 1212. In block 1212, the target index server replies success or failure to the index controller 140. This is the response that the index controller 140 is waiting for in block 1124 (FIG. 11C).

In block 1214, the target index server performs other processing.

Figure 13A:
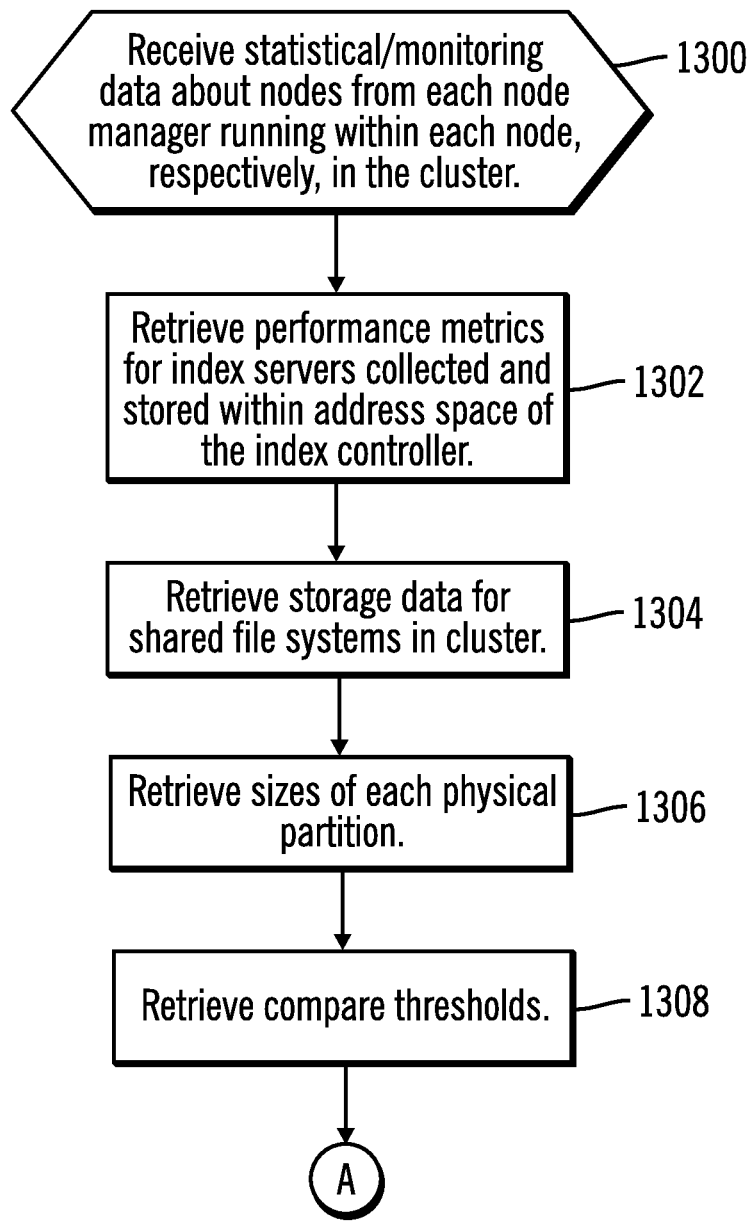
FIG. 13 illustrates logic performed by a trigger generator component of an index controller in accordance with certain embodiments.
Figure 13B:
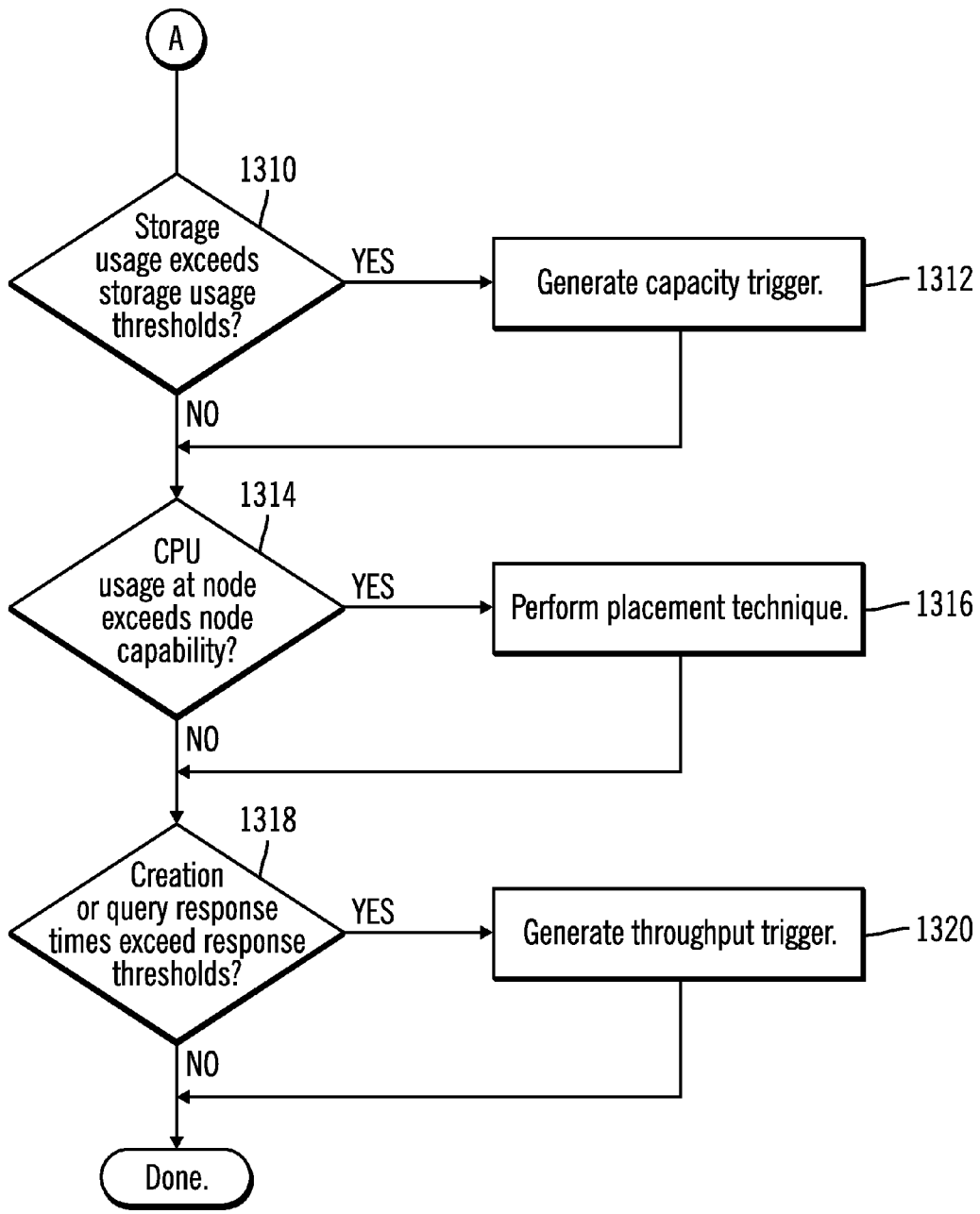

FIG. 13 illustrates logic performed by the trigger generator component 200 of the index controller 140 in accordance with certain embodiments. FIG. 13 is formed by FIGS. 13A and 13B. Control begins in block 13A with the trigger generator component 200 receiving statistical/monitoring data about nodes 110, 120, 130 from each node manager 112, 122, 132 running within each node 110, 120, 130, respectively, in the cluster. In block 1302 the trigger generator component 200 retrieves performance metrics for the index servers 114, 124, 126, 134 collected and stored within address space of the index controller 140. In block 1304, the trigger generator component 200 retrieves storage data for the shared file systems 162, 164 in the cluster. In block 1306, the trigger generator component 200 retrieves sizes of each physical partition. In block 1308, the trigger generator component 200 retrieves compare thresholds. In certain embodiments, examples of thresholds may be expressed as rules where, if the quantity is performance metrics, then the CPU utilization on a given node may be considered to be too high if the CPU utilization exceeds 80% utilization or if memory consumption on the node exceeds 60%. The actual values can be obtained by well known techniques that most operating systems provide for performance monitoring.

From block 1308 (FIG. 13A), processing continues to block 1310 (FIG. 13B). In block 1310, the trigger generator component 200 determines whether storage usage exceeds storage usage thresholds. If so, processing continues to block 1312, otherwise, processing continues to block 1314. In block 1312, the trigger generator component 200 generates a capacity trigger.

In block 1314, the trigger generator component 200 determines whether CPU usage at a node exceeds a node capability. If so, processing continues to block 1316, otherwise, processing continues to block 1318. In block 1316, the trigger generator component 200 performs the placement technique.

In block 1318, the trigger generator component 200 determines whether creation or query response times exceed respond thresholds. If so, processing continues to block 1320, otherwise, processing is done. In block 1320, the trigger generator component 200 generates a throughput trigger.

Figure 14:
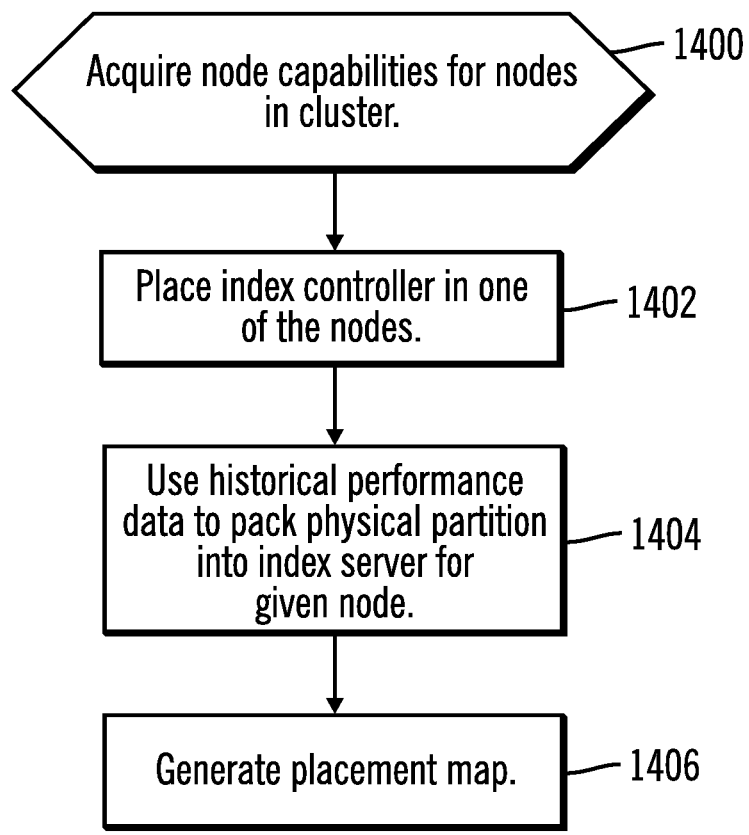
FIG. 14 illustrates logic performed by a placement component of an index controller to perform the placement technique in accordance with certain embodiments.

FIG. 14 illustrates logic performed by the placement component 210 of the index controller 140 to perform the placement technique in accordance with certain embodiments. Control begins at block 1400 with the index controller 140 acquiring node capabilities for nodes in the cluster. In block 1402, the index controller 140 places itself in one of the nodes 110, 120, 130 (e.g., randomly or by some other technique). In block 1404, the index controller 140 uses historical performance data to pack physical partitions into an index server 114, 124, 126, 134 for a given, respective, node 110, 120, 130. In block 1406, the index controller 140 generates a placement map 222. This placement map 222 is an in-memory map that enumerates where each physical partition I[0],I[1] etc are grouped and placed to be hosted by each index server and eventually where each index server is hosted on which specific node. This computation is well defined in academia as a bin-packing and/or a knapsack problem in dynamic programming. The goal of block 1406 is to arrive at an optimal placement of disjoint sets of physical partitions to one or more index servers as well as an optimal placement of index servers to node based on resources and capabilities of the nodes. The placement technique is referenced in block 428 of FIG. 4C.

In certain embodiments, the index state maintained within the physical partition I[1],I[2] etc in the shared file system 320 in FIG. 3 is semi-volatile and can be reconstructed from the index controller 140 that uses the DBMS to track all operations persistently, that arrive from the application 100 in FIG. 2. Also, the cost of spinning up a new physical partition within some shared file system path is inexpensive, and history tracking for the triggers logic is inexpensive. Moreover, the placement technique completes in reasonable time as it is required to keep the virtual-index-epoch transition time within bounds.

In some embodiments, the placement technique performs node location and placement of physical partition's to index servers by computing an optimal placement that capitalizes on spare CPU and storage capacity. In certain embodiments, the placement technique may be a typical greedy bucket assignment type technique, with the assumption that actual remote placement infrastructure is available. This includes the notion that an index can be re-placed to a different location, if necessary.

For the placement technique, the node availability is not considered specifically, however, it is assumed that one or more indexes hosted on a location can be recovered independently from any node within the cluster, from past history in the index controller which tracks all application operations in a persistent queue structure within the DBMS.

The index controller 140 is started by hand-tooling the E0 virtual-index-epoch. This involves bringing up the index controller 140 with a fixed number of index instances (e.g., N0=1). That is, there exists a base virtual-index-epoch for the index controller 140 to boot-up.

The CRUD and the query rely on a consistent view of the map. For CRUD operations, this relies on determining the home location for a given assigned-doc-ID. This is done by first doing a range partition for the virtual-index-epoch using the cutoff assigned-doc-ID, then applying the F(i) general partitioning function for the given virtual-index-epoch. A general partitioning function can be specified in many ways that a person conversant in the art would know, for example the partitioning function can be a simple modulo of the number of logical indexes within the virtual index-epoch using the assigned-document-ID. Or in other embodiments it can be a user defined method that uses a well known data field from the document other than the assigned-document-id and some general hash function and a modulo of the number of logical indexes within the virtual-index-epoch to arrive at which specific logical index the document must be assigned to.

Figure 15:
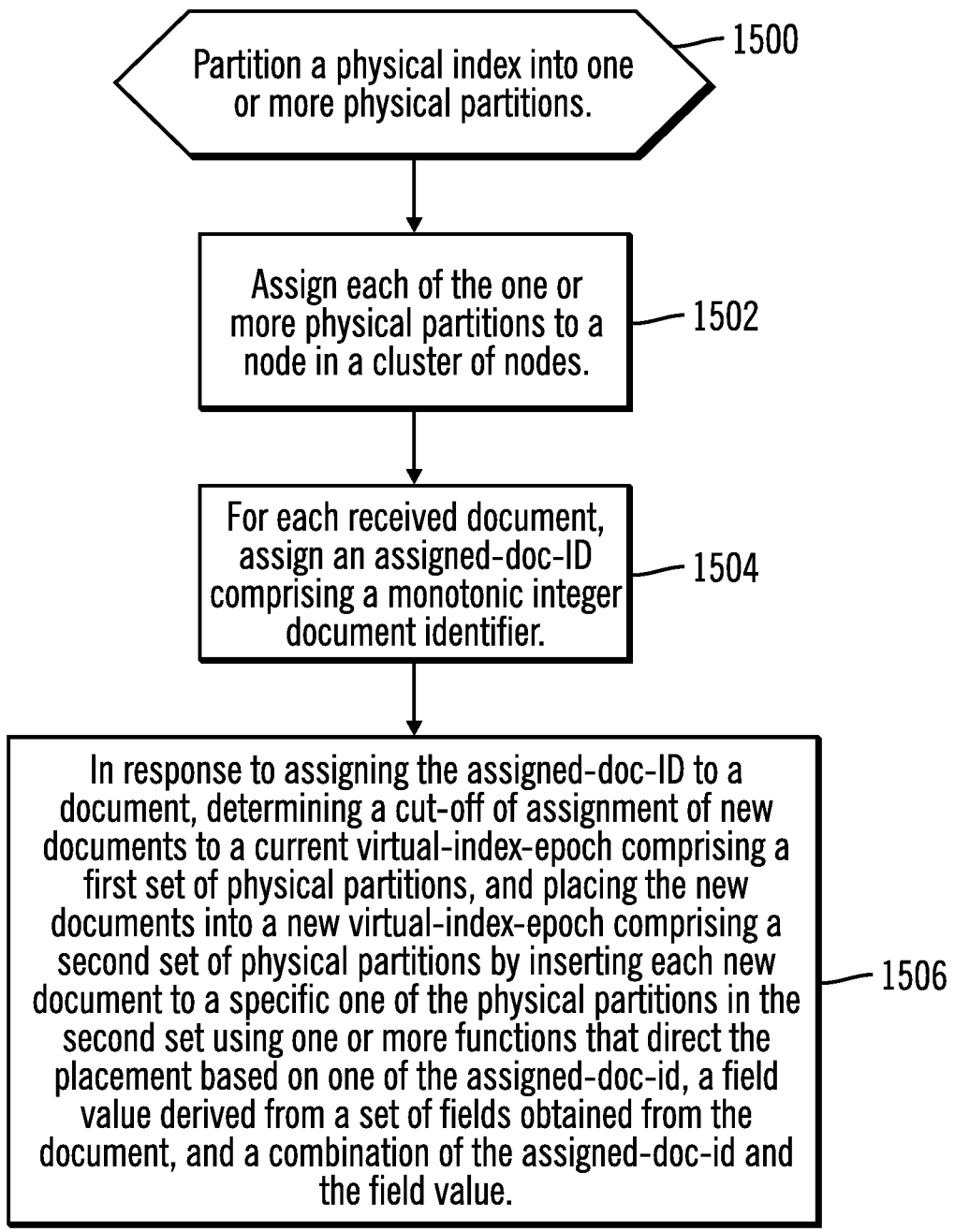
FIG. 15 illustrates logic performed by a Highly Scalable Indexing Platform (HSIP) in accordance with certain embodiments.

FIG. 15 illustrates logic performed by the Highly Scalable Indexing Platform (HSIP) 190 in accordance with certain embodiments. Control starts at block 1500 with the HSIP 190 partitioning a physical index into one or more physical partitions. In block 1502, the HSIP 190 assigns each of the one or more physical partitions to a node in a cluster of nodes. In block 1504, for each received document, the HSIP 190 assigns an assigned-doc-ID comprising a monotonic integer document identifier. In block 1506, in response to assigning the assigned-doc-ID to a document, the HSIP 190 determines a cut-off of assignment of new documents to a current virtual-index-epoch comprising a first set of physical partitions and places the new documents into a new virtual-index-epoch comprising a second set of physical partitions by inserting each new document to a specific one of the physical partitions in the second set using one or more functions that direct the placement based on one of the assigned-doc-id, a field value derived from a set of fields obtained from the document, and a combination of the assigned-doc-id and the field value. That is, each virtual-index-epoch may be described as a set of physical partitions that are logically numbered in the virtual-index-epoch.

The precise assignment may be obtained by way of the virtual-index-epoch map and is obtained by first determining the assigned-doc-ID to a set of indexes and applying the function as needed to obtain the physical partition within the index set.

With embodiments, the assigned-doc-ID comprises a monotonically increasing, non-reusable unique identifier is a monotonically increasing number of sufficient precision. The HSIP 190 maintains a persistent, transactionally recoverable structure that stores the virtual-index-epoch map. The HSIP 190 dynamically maintains the virtual-index-epoch map to accommodate changes in the system capacity, modeled performance of a physical partition, and actual performance of a physical partition. The HSIP 190 maintains the virtual-index-epoch map by creating or deleting virtual-index-epoch numbers from the virtual-index-epoch map. The HSIP 190 includes rows in the virtual-index-epoch map based on the assigned-doc-ID for the document that triggered maintenance of the virtual-index-epoch map and columns based on a number of physical partitions deemed to be sufficient to meet the performance criteria.

The HSIP 190 optimizes a total number of the physical partitions by reusing the physical partitions. The one or more functions are either system determined or user specified, wherein the system determined functions are based on one of system capacity, modeled performance of a physical partition, and actual performance of the physical partition. Also, the determined cut-off comprises the current assigned-doc-ID plus a cushion, wherein the cushion is specified to provide a means to not block other CRUD and query sessions that can occur while the virtual-index-epoch transition is occurring.

Embodiments scale in capacity, improve availability, scale creation operations with search throughput, and improve manageability of large full text indexes. In certain embodiments, the index controller 140 partitions an index into a one or more physical partitions, assigns a document to a two-dimensional map based on a document ID and a field value, and derives the field value from a set of functions (one or more functions), the set of functions being either system determined or user specified. In certain embodiments, index controller 140 the system determined functions are based on one of: system capacity, modeled performance of a physical partition, and actual performance of a physical partition. In certain embodiments, index controller 140 assigns each physical partition to a node in a cluster. In certain embodiments, the index controller 140 assigns the document ID, which is a monotonically increasing number of sufficient precision. In certain embodiments, the index controller 140 maintains a persistent, transactionally recoverable structure that maintains the two-dimensional map. In certain embodiments, the index controller 140 dynamically maintains the map to accommodate changes in any of the following: system capacity, modeled performance of a physical partition, and actual performance of a physical partition. In certain embodiments, the index controller 140 maintains the map structure and the group structure by modifying, deleting or expanding the structure. In certain embodiments, the index controller 140 includes in the map structure, rows based on the document ID for a current document that triggered maintenance of the map and columns based on a number of indexes deemed to be sufficient to meet the performance criteria. In certain embodiments, the index controller 140 optimizes a total number of the indexes by reusing the indexes, from one column and one row in the map, in one or more additional columns or one or more additional rows in the map through system defined methods.

Embodiments partition the index from the beginning into a series of virtual-index-epochs, each virtual-index-epoch consisting of a range of documents based on monotonically-increasing document IDs. For each virtual-index-epoch, embodiments break the virtual-index-epoch into a variable number of logical partitions and assign each logical partition to a physical partition. Physical partitions (e.g., a single file system instance) can contain multiple logical partitions. The logical partitions for any one virtual-index-epoch can each be assigned to any arbitrary physical partition. The assignment of a logical partition to a physical partition is done to optimize storage performance, so that virtual-index-epochs could be distributed over multiple physical partitions to allow better concurrency, for instance. More specifically, embodiments optimize the resources used to maintain the virtual-index-epoch map. Each physical partition is a real physical partition taking up storage and operating system resources, such as descriptors, memory, etc. Embodiments provide efficient mapping from document ID to virtual-index-epoch, then to logical partition, then to physical partition, such that the full text search can be presented with a single virtual index.

Embodiments provide a single index view for all applications. Embodiments dynamically or manually detect that a reconfiguration of scale is needed to sustain both storage limits or insufficient throughput. Embodiments continue the act of data creation via CRUD and sustain query processing while reconfiguration actually occurs. Limited manual intervention is required. For example, manual intervention may occur when a manual trigger is needed and/or the supply of machine and resource is needed. This keeps the total cost of ownership for such a reconfiguration very low.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 16:
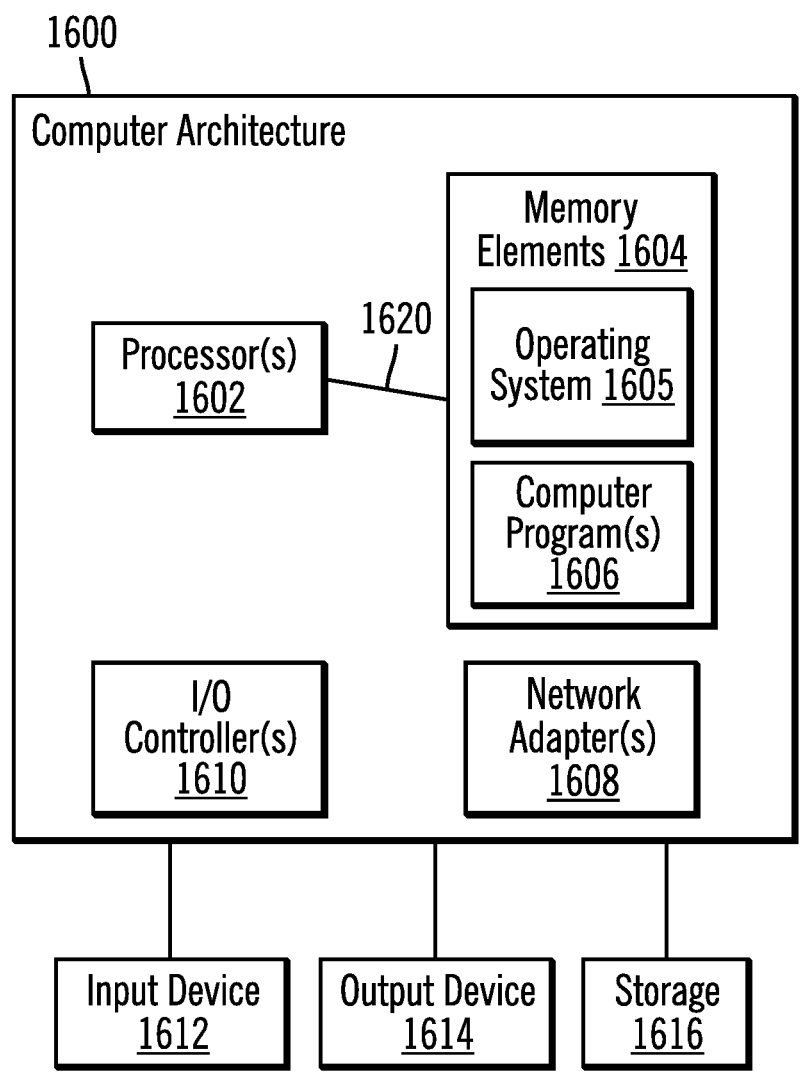
FIG. 16 illustrates a computer system that may be used in accordance with certain embodiments.

FIG. 16 illustrates a computer system 1600 that may be used in accordance with certain embodiments. Node1 110, node2 120, and/or node3 130 may implement computer system 1600. The computer system 1600 is suitable for storing and/or executing program code and includes at least one processor 1602 coupled directly or indirectly to memory elements 1604 through a system bus 1620. The memory elements 1604 may include local memory employed during actual execution of the program code, bulk storage, and cache memories which provide temporary storage of at least some program code in order to reduce the number of times code must be retrieved from bulk storage during execution. The memory elements 1604 include an operating system 1605 and one or more computer programs 1606.

Input/Output (I/O) devices 1612, 1614 (including but not limited to keyboards, displays, pointing devices, etc.) may be coupled to the system either directly or through intervening I/O controllers 1610.

Network adapters 1608 may also be coupled to the system to enable the data processing system to become coupled to other data processing systems or remote printers or storage devices through intervening private or public networks. Modems, cable modem and Ethernet cards are just a few of the currently available types of network adapters 1608.

The computer system 1600 may be coupled to storage 1616 (e.g., a non-volatile storage area, such as magnetic disk drives, optical disk drives, a tape drive, etc.). The storage 1616 may comprise an internal storage device or an attached or network accessible storage. Computer programs 1606 in storage 1616 may be loaded into the memory elements 1604 and executed by a processor 1602 in a manner known in the art.

The computer system 1600 may include fewer components than illustrated, additional components not illustrated herein, or some combination of the components illustrated and additional components. The computer system 1600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer-implemented method, comprising:
   in response to receiving a new document,
      generating an assigned-doc-ID for the new document;
      identifying, for the assigned-doc-ID, a virtual-index-epoch from a virtual-index-epoch map that includes virtual-index-epochs that are each assigned a range of assign-doc-IDs;
      applying a first function to a virtual-index-epoch value of the identified virtual-index-epoch to identify a logical partition;
      applying a second function to the identified logical partition to identify a physical partition; and
      placing the new document into the identified physical partition associated with the identified virtual-index-epoch.

2. The method of claim 1, wherein the assigned-doc-ID comprises a non-reusable unique identifier that is a monotonically increasing number of sufficient precision.

3. The method of claim 1, further comprising:
   maintaining a persistent, transactionally recoverable structure that stores the virtual-index-epoch map.

4. The method of claim 3, further comprising:
   dynamically maintaining the virtual-index-epoch map to accommodate changes in the system capacity, modeled performance of a physical partition, and actual performance of a physical partition.

5. The method of claim 3, further comprising:
   maintaining the virtual-index-epoch map by at least one of creating and deleting virtual-index-epoch numbers from the virtual-index-epoch map.

6. The method of claim 5, further comprising:
   including in the virtual-index-epoch map rows based on the assigned-doc-ID for the document that triggered maintenance of the virtual-index-epoch map and columns based on a number of physical partitions deemed to be sufficient to meet the performance criteria.

7. The method of claim 6, further comprising:
   optimizing a total number of the physical partitions by reusing at least some of the physical partitions.

8. The method of claim 1, wherein the first function and the second function are one of system determined and user specified, and wherein the system determined functions are based on one of system capacity, modeled performance of a physical partition, and actual performance of the physical partition.

9. A system, comprising:
   a processor; and
   storage coupled to the processor, wherein the storage stores a computer program, and wherein the processor is configured to execute instructions of the computer program to perform operations, the operations comprising:
   in response to receiving a new document,
      generating an assigned-doc-ID for the new document;
      identifying, for the assigned-doc-ID, a virtual-index-epoch from a virtual-index-epoch map that includes virtual-index-epochs that are each assigned a range of assign-doc-IDs;
      applying a first function to a virtual-index-epoch value of the identified virtual-index-epoch to identify a logical partition;
      applying a second function to the identified logical partition to identify a physical partition; and
   placing the new document into the identified physical partition associated with the identified virtual-index-epoch.

10. The system of claim 9, wherein the operations further comprise:
    maintaining a persistent, transactionally recoverable structure that stores the virtual-index-epoch map.

11. The system of claim 10, wherein the operations further comprise:
    dynamically maintaining the virtual-index-epoch map to accommodate changes in the system capacity, modeled performance of a physical partition, and actual performance of a physical partition.

12. The system of claim 10, wherein the operations further comprise:
    maintaining the virtual-index-epoch map by at least one of creating and deleting virtual-index-epoch numbers from the virtual-index-epoch map.

13. The system of claim 12, wherein the operations further comprise:
    including in the virtual-index-epoch map rows based on the assigned-doc-ID for the document that triggered maintenance of the virtual-index-epoch map and columns based on a number of physical partitions deemed to be sufficient to meet the performance criteria.

14. The system of claim 13, wherein the operations further comprise:
    optimizing a total number of the physical partitions by reusing at least some of the physical partitions.

15. The system of claim 9, wherein the first function and the second function are one of system determined and user specified, wherein the system determined functions are based on one of system capacity, modeled performance of a physical partition, and actual performance of the physical partition.

16. The system of claim 9, wherein the assigned-doc-ID comprises a non-reusable unique identifier that is a monotonically increasing number of sufficient precision.

17. A computer program product comprising a tangible computer readable storage medium including a computer readable program, wherein the computer readable program when executed by a processor on a computer causes the computer to perform:
    in response to receiving a new document,
       generating an assigned-doc-ID for the new document;
       identifying, for the assigned-doc-ID, a virtual-index-epoch from a virtual-index-epoch map that includes virtual-index-epochs that are each assigned a range of assign-doc-IDs;
       applying a first function to a virtual-index-epoch value of the identified virtual-index-epoch to identify a logical partition;
       applying a second function to the identified logical partition to identify a physical partition; and
       placing the new document into the identified physical partition associated with the identified virtual-index-epoch.

18. The computer program product of claim 17, wherein the computer readable program when executed by the processor on the computer causes the computer to perform:
    maintaining a persistent, transactionally recoverable structure that stores the virtual-index-epoch map.

19. The computer program product of claim 18, wherein the computer readable program when executed by the processor on the computer causes the computer to perform:
    dynamically maintaining the virtual-index-epoch map to accommodate changes in the system capacity, modeled performance of a physical partition, and actual performance of a physical partition.

20. The computer program product of claim 18, wherein the computer readable program when executed by the processor on the computer causes the computer to perform:

maintaining the virtual-index-epoch map by at least one of creating and deleting virtual-index-epoch numbers from the virtual-index-epoch map.

21. The computer program product of claim 20, wherein the computer readable program when executed by the processor on the computer causes the computer to perform:
including in the virtual-index-epoch map rows based on the assigned-doc-ID for the document that triggered maintenance of the virtual-index-epoch map and columns based on a number of physical partitions deemed to be sufficient to meet the performance criteria.

22. The computer program product of claim 21, wherein the computer readable program when executed by the processor on the computer causes the computer to perform:
optimizing a total number of the physical partitions by reusing at least some of the physical partitions.

23. The computer program product of claim 17, wherein the first function and the second function are one of system determined and user specified, wherein the system determined functions are based on one of system capacity, modeled performance of a physical partition, and actual performance of the physical partition.

24. The computer program product of claim 17, wherein the assigned-doc-ID comprises a non-reusable unique identifier that is a monotonically increasing number of sufficient precision.

* * * * *